United States Patent [19]

Hou

[11] Patent Number: 6,079,152

[45] Date of Patent: Jun. 27, 2000

[54] GREENHOUSE STRUCTURE

[76] Inventor: Chuwg-Chu Hou, P.O. Box 82-144, Taipei, Taiwan

[21] Appl. No.: 09/172,632

[22] Filed: Oct. 14, 1998

[51] Int. Cl.[7] ............................ A01G 13/00; A01G 9/14; E04B 1/12

[52] U.S. Cl. ................................. 47/17; 52/63; 160/84 R

[58] Field of Search ................... 47/20, 17, 19; 160/84.01; 52/63, 66, 13

[56] References Cited

U.S. PATENT DOCUMENTS

| | | | |
|---|---|---|---|
| 589,677 | 9/1897 | Witte | 47/17 |
| 889,349 | 6/1908 | Wilson | 47/17 |
| 1,939,015 | 12/1933 | McLellan | 47/17 |
| 4,565,230 | 1/1986 | Van Rijn et al. | 47/17 |
| 4,837,990 | 6/1989 | Peleg | 52/63 |
| 5,140,788 | 8/1992 | Lynch | 52/63 |
| 5,265,373 | 11/1993 | Vollebregt | 47/17 |
| 5,410,844 | 5/1995 | Lynch | 52/63 |
| 5,655,335 | 8/1997 | Vermeer | 52/66 |

*Primary Examiner*—Peter M. Poon
*Assistant Examiner*—Francis T Palo
*Attorney, Agent, or Firm*—A & J

[57] ABSTRACT

A greenhouse structure, in particular a greenhouse that employs an automatic control system to control the opening and closing of skylights and side windows, the extending or closing of upper and inner sun-shielding screens, and the convection and circulation of air inside the greenhouse. The construction thereof is simple and quick.

1 Claim, 34 Drawing Sheets

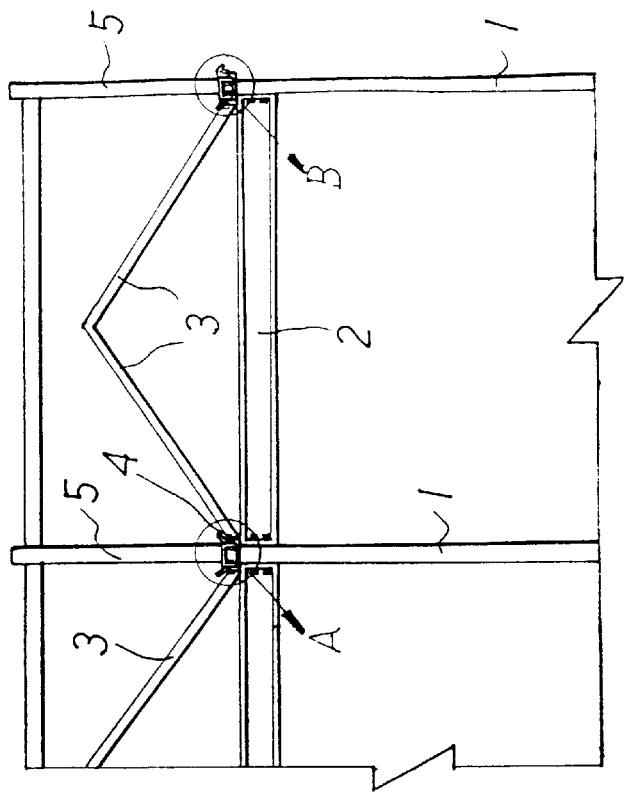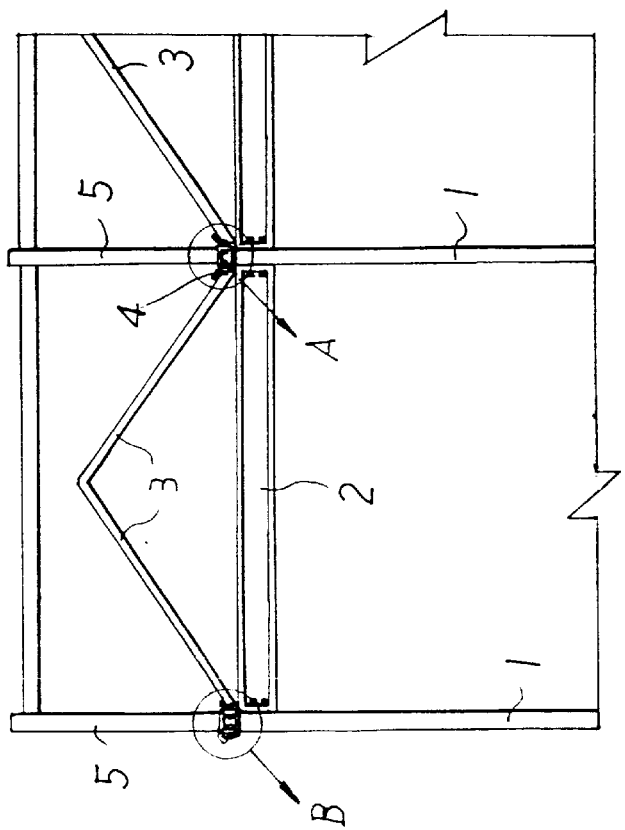
FIG. 1

GREENHOUSE STRUCTURE

BACKGROUND OF THE INVENTION

1. Field of the Invention

The present invention relates to a greenhouse structure.

2. Description of the Prior Art

A greenhouse is a major facility for intensive and high-economic value agriculture. It provides a good growing environment for crops. The greenhouse is an enclosed glass house used for growing plants, in regulated temperatures, humidity, and ventilation. Greenhouses have long been used for holding plants over cold seasons and to some extent for growing tropical plants and hothouse fruit. However, it is time-consuming and very inconvenient to built a greenhouse.

Therefore, it is an object of the present invention to provide a greenhouse structure which can obviate and mitigate the above-mentioned drawbacks.

SUMMARY OF THE INVENTION

The present invention relates to a greenhouse structure.

A primary object of the present invention is to provide a greenhouse structure, in which the structural components are easy to manufacture, and the installation of the greenhouse is quick and convenient, hence achieving practical effects in use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a plan view of the framework according to the present invention;

DETAILED DESCRIPTION OF THE PREFERRED EMBODIMENT

Figure 2:
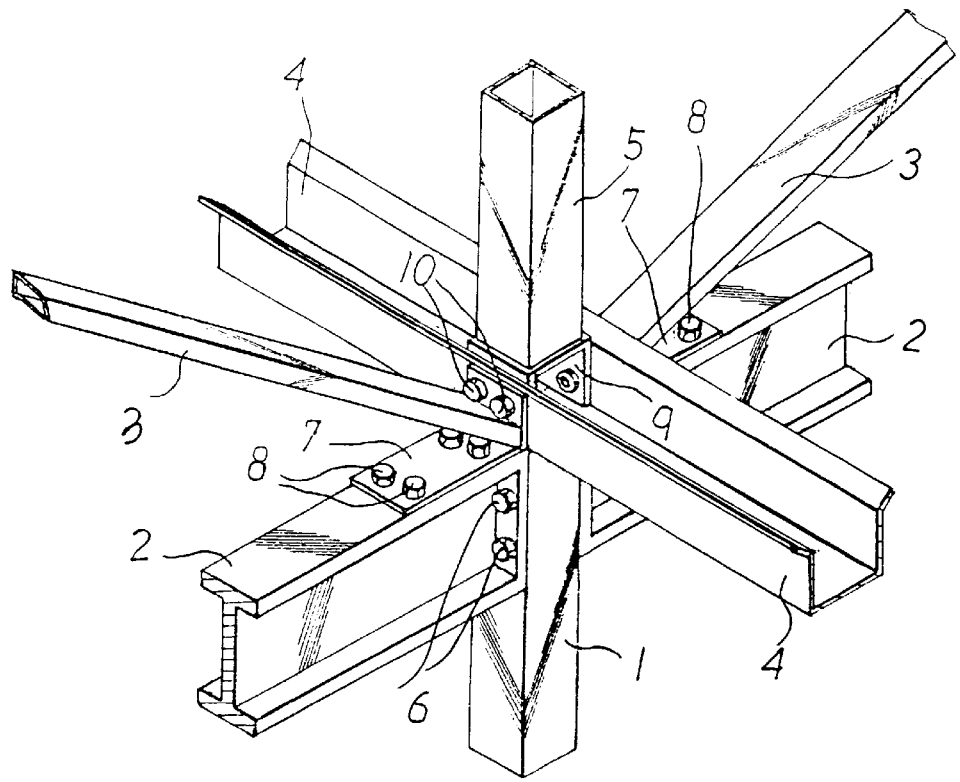
FIG. 2 is a perspective view of the framework joints according to the present invention.

With reference to FIG. 1, a greenhouse framework according to the present invention comprises spaced upright support posts 1, beams 2 connecting upper ends of the support posts 1, rafters 3, water troughs 4, and upright studs 5.

Referring to FIGS. 1 and 2, bolts 6 are used to drive into beams 2 to secure them to both sides of the top end of each support post 1. (In general, the beams are steel beams having an I-shaped, C-shaped, or rectangular cross section, so are the rafters 3 and the studs 5.) The water troughs 4 have a U-shaped cross section and are secured on the top end face of the support posts 1 in a longitudinal direction. An L-shaped securing plate 7 is welded to a bottom end of the rafter 3. A horizontal end of the L-shaped securing plate 7 is lockably secured to the beam 2 using bolts 8. An inverted-U shaped base 9 is welded to a bottom end of the stud 5.

A frame is mounted at top ends of the studs 5 to support a sun-shielding screen. The L-shaped securing plates 7 at the bottom ends of the rafters 3 are locked to the outer sides of the respective water troughs 4 using bolts 10, while the studs 5 and the bases 9 thereof are together locked to the inner sides of the respective water troughs 4.

Figure 4:
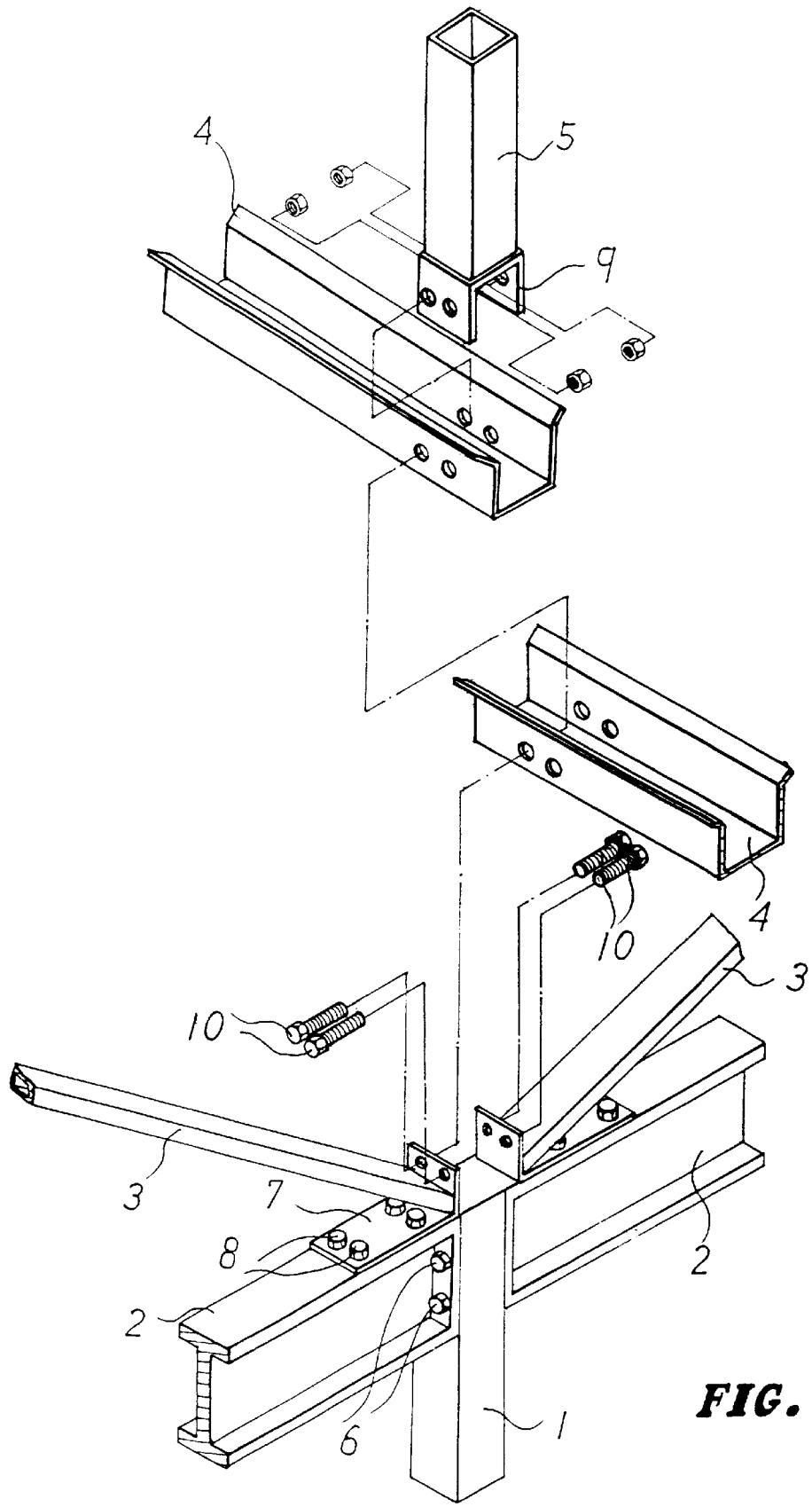
FIG. 4 is a perspective exploded view of the framework joints according to the present invention.
Figure 5:
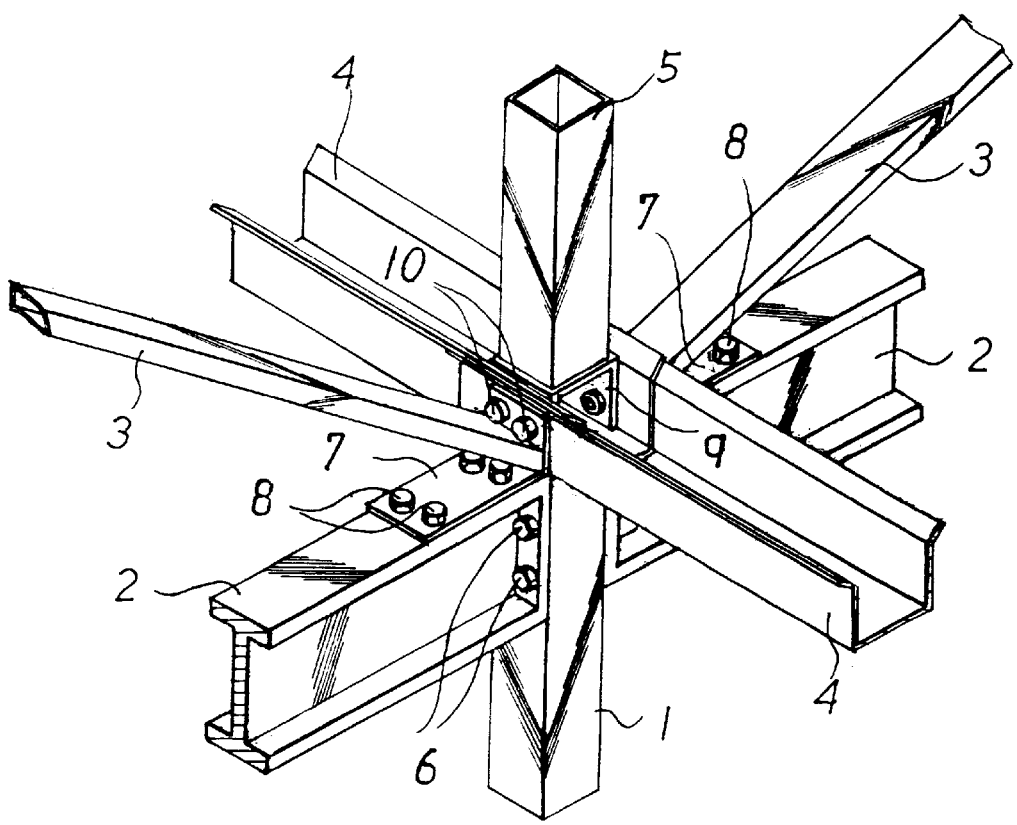
FIG. 5 is another perspective view of the framework joints according to the present invention.
Figure 6:
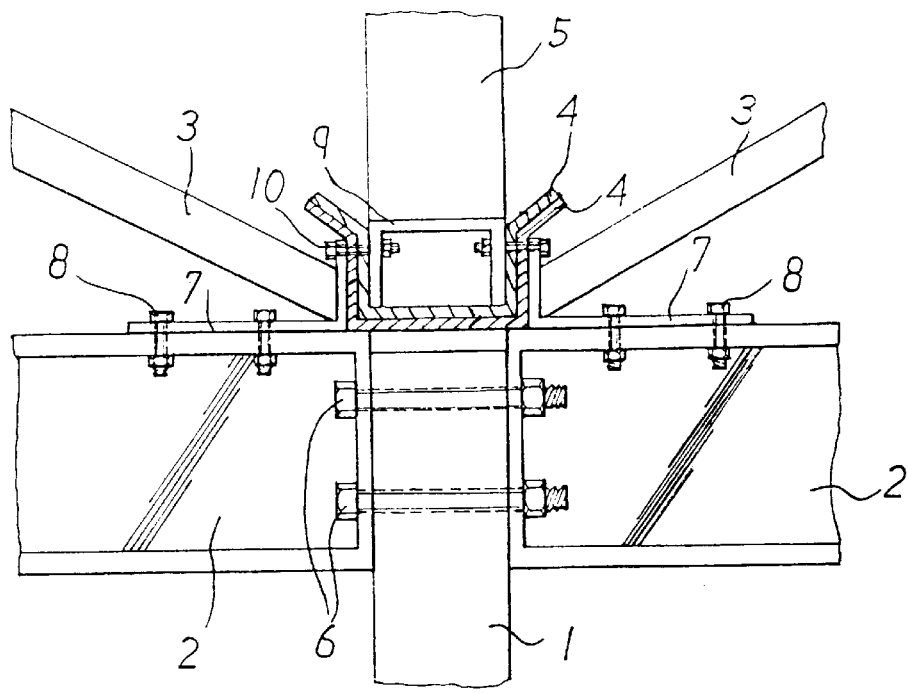
FIG. 6 is another plan view of the framework joints according to the present invention.

As shown in FIGS. 4, 5, and 6, the water troughs 4 can be directly joined by lapping on the top end face of the support post 1 and are likewise locked in position by bolts 10 before being subjected to a leakage-proof treatment.

Figure 7:
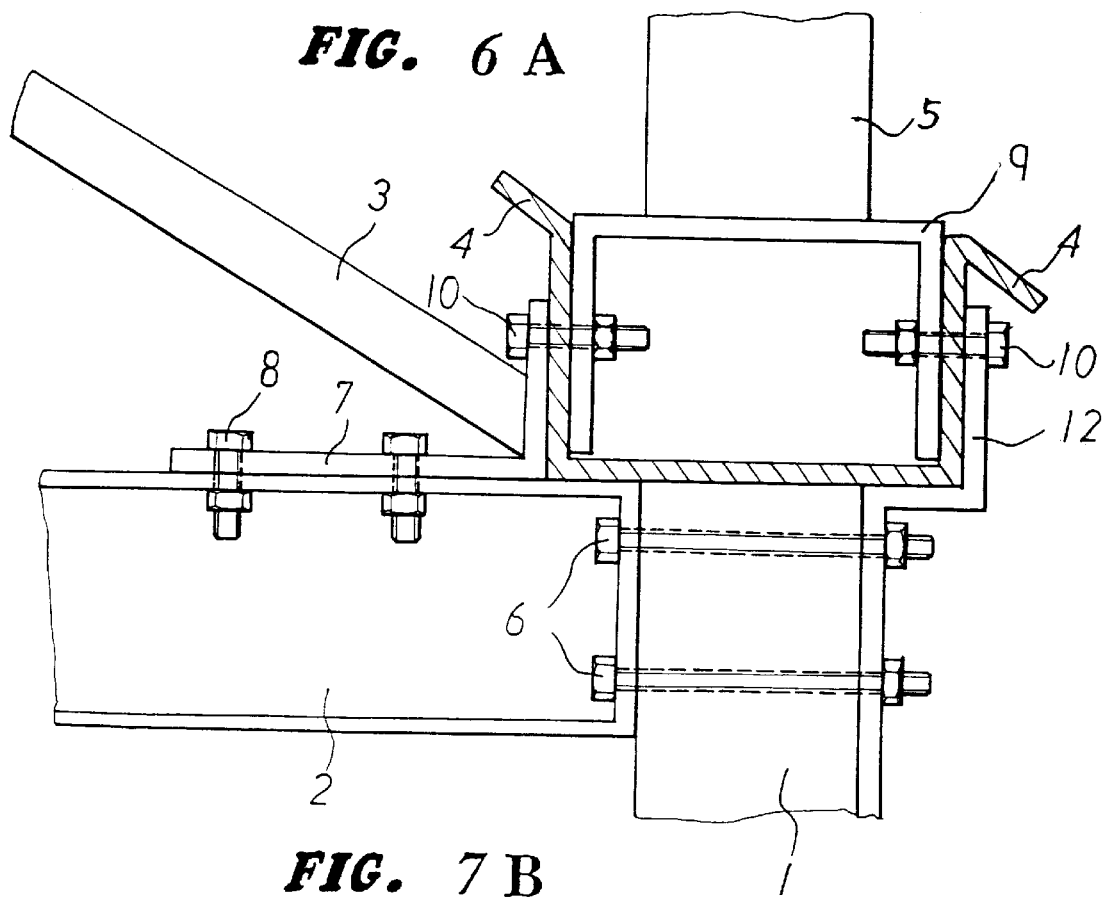
FIG. 7 is still another plan view of the framework joints according to the present invention.

Furthermore, as shown in FIG. 7, the water troughs 4 on the top end of the support posts 1 on the two outer sides of the greenhouse have their outer side ends bent downwardly to form an acute angle so as to cover securing plates 12, thereby preventing penetration of rainwater into the greenhouse.

The L-shaped securing plates 7 welded to the bottom ends of the rafters 3 allow the beams 2 to be secured thereon on the one hand, and permit the water troughs 4 and the studs 5 to be jointly locked thereon. Besides, the joints of the water troughs 4 can be secured to achieve an improved practical effect.

Figure 8:
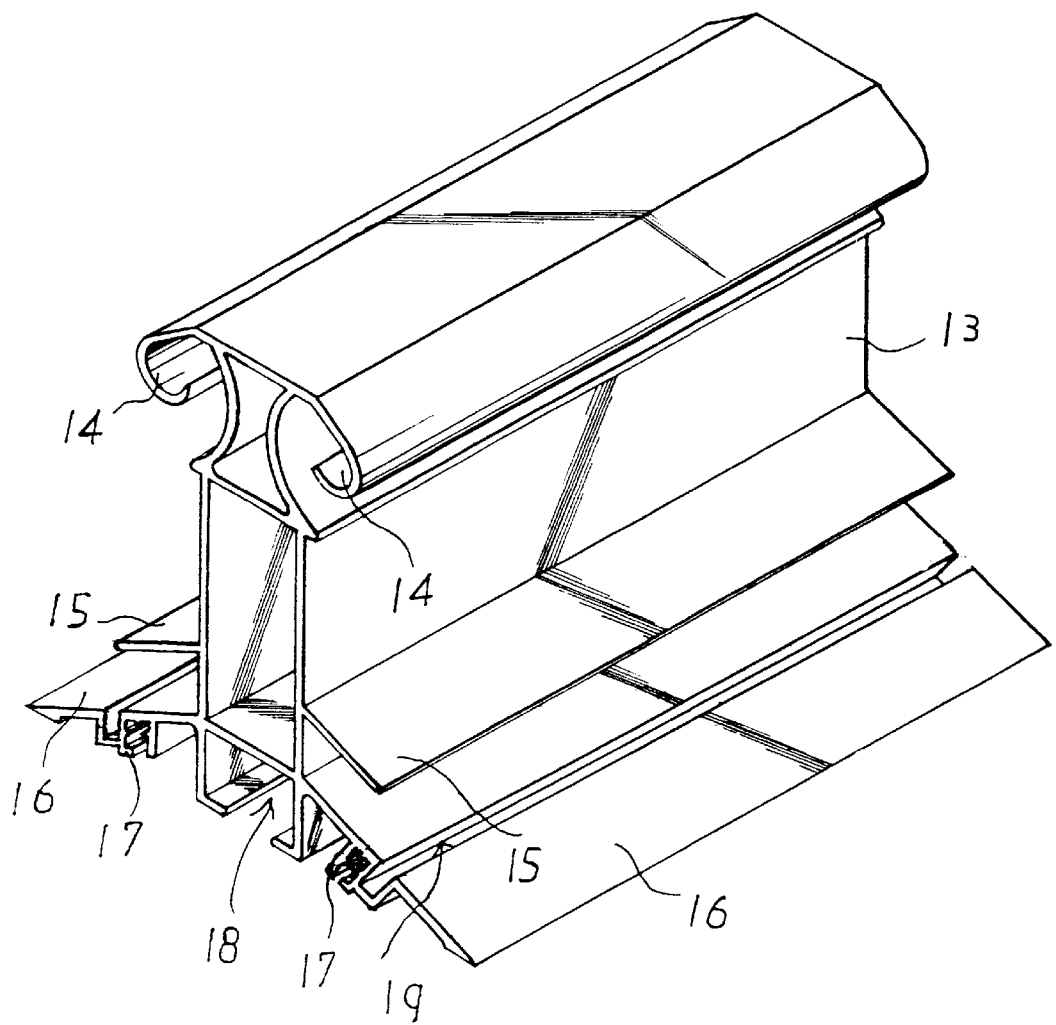
FIG. 8 is a perspective view of the skylight king post according to the present invention.

Roof king posts:

Referring to FIG. 8, a rectangular frame-shaped king post 13 has an upper end orienting upwardly and extending in opposite directions to both sides to form curled hook portions 14. The two sides of the king post 13 near its bottom end respectively extend outwardly in opposite directions to form downwardly inclined side plates 15. The two end corners at the bottom end also extend outwardly respectively to form oblique plates 16 that go beyond the side plates 15 and are parallel thereto. A retaining groove 18 having a T-shaped cross section extends along the bottom side of the king post 1. The oblique plates 16 each have a frame-shaped retaining gap 17 extending along a bottom portion thereof. An indented groove 19 is provided on a top side of the oblique plate adjacent to the retaining gap 17.

Figure 9:
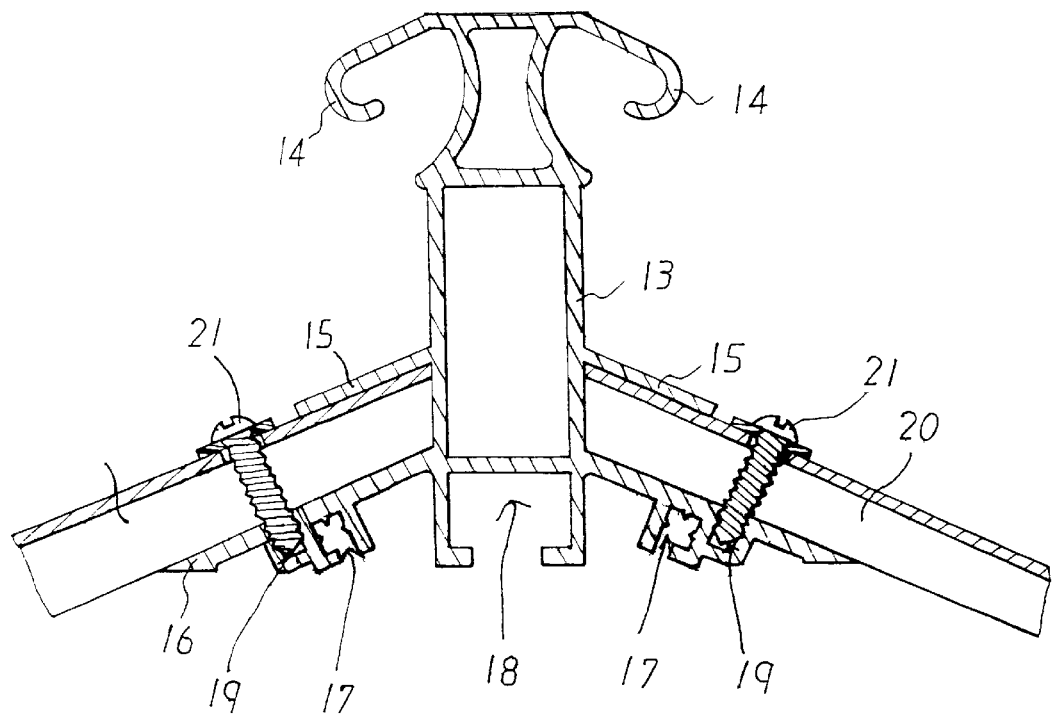
FIG. 9 is a sectional view of the skylight king post according to the present invention.
Figure 15:
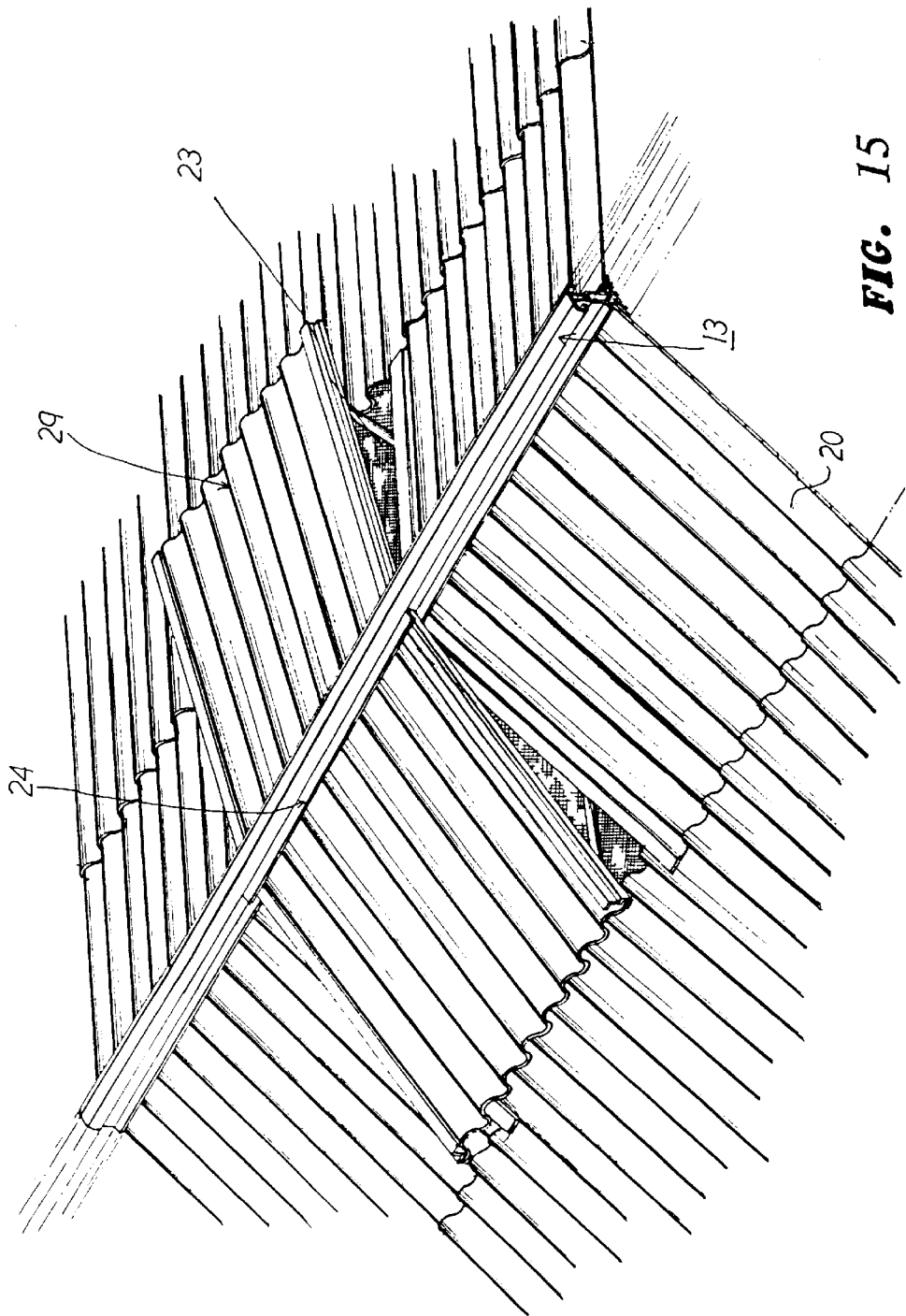
FIG. 15 is a perspective schematic view of the skylight king post according to the present invention.

With reference to FIG. 9, the clearance between the side plate and the oblique plate 16 may just receive a planar or corrugated board 20 to form a roof (as shown in FIG. 15). As the oblique plate 16 extends beyond the side plate 15 and the indented groove 19 is also located beyond the side plate 15, tap bolts 21 may be used to lock the corrugated board 20 in the indented groove 19. In particular, the distance between the indented groove and the king post 13 is fixed, so that the corrugated boards 20 may be punched to form securing holes for the tap bolts 21 in the factory in advance, hence facilitating construction work.

Figure 10:
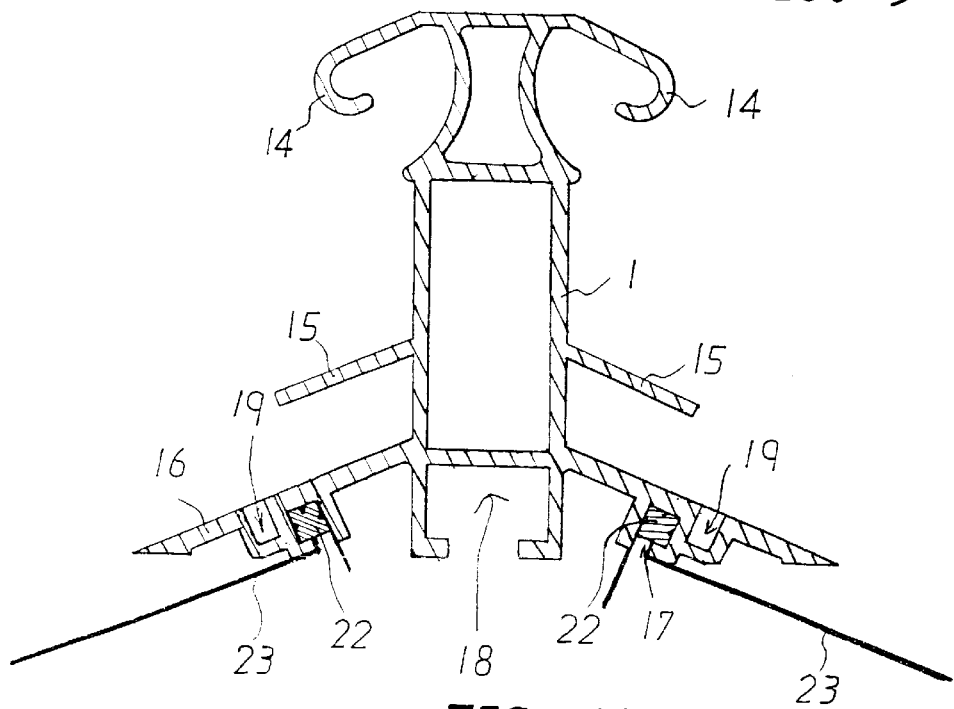
FIG. 10 is another sectional view of the skylight king post according to the present invention.

Referring to FIG. 10, the retaining gap 17 extending along the bottom portion of the oblique plate 16 receives a hold-down strip 22 to thereby secure a pest net 23. The retaining groove 18 on the bottom portion of the king post 13 receives retaining bolts to secure other necessary groove elements or objects.

Figure 11:
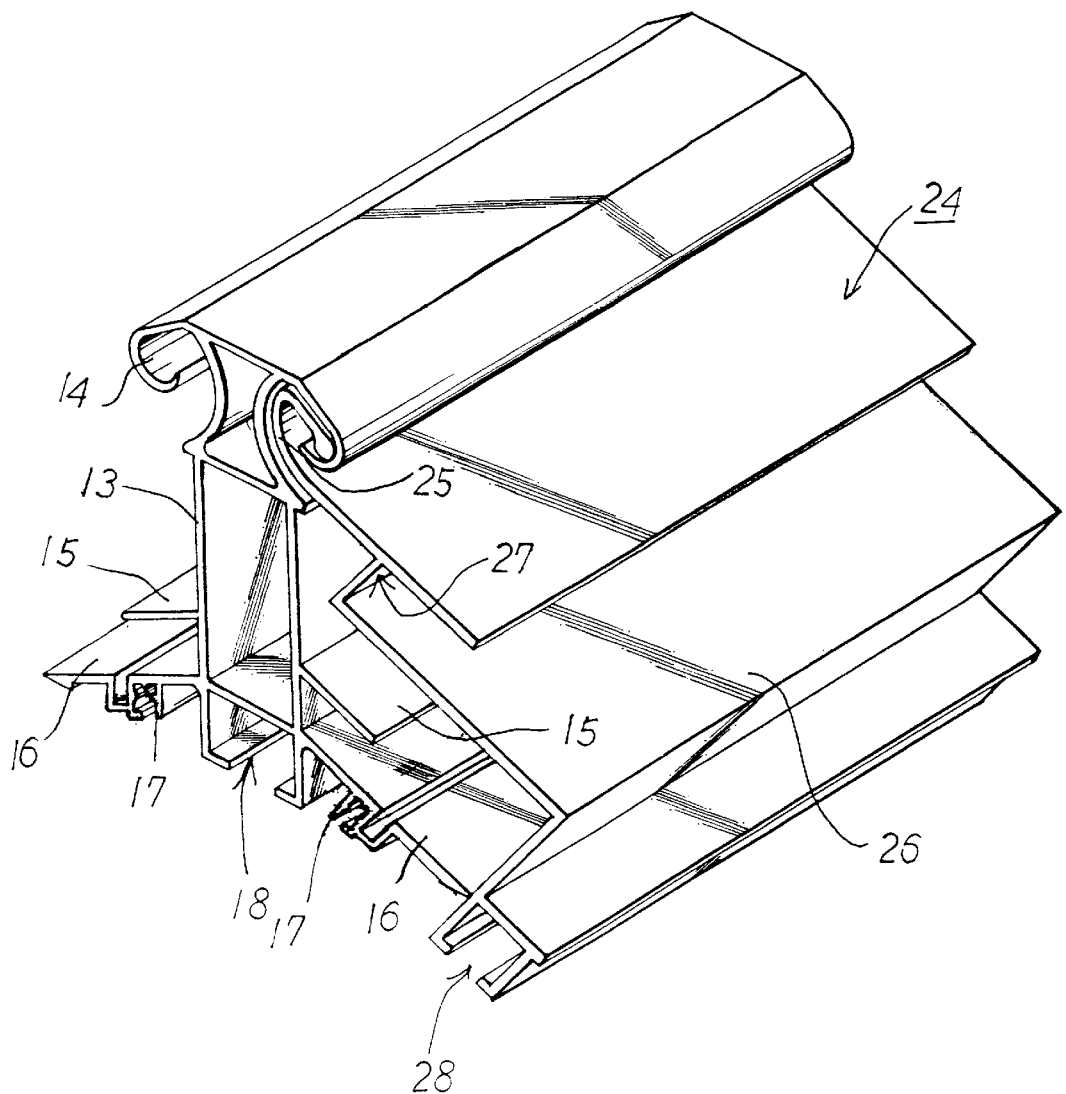
FIG. 11 is a perspective view of the skylight king post according to the present invention.
Figure 12:
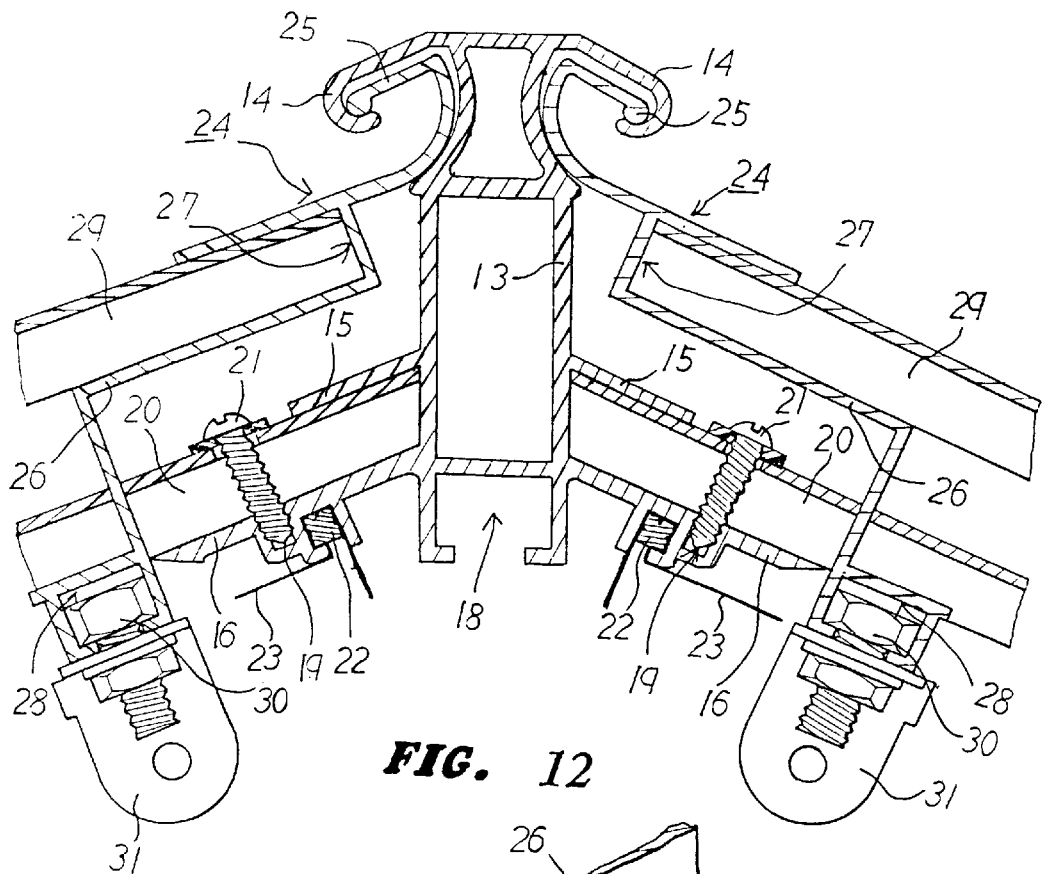
FIG. 12 is another sectional view of the skylight king post according to the present invention.
Figure 13:
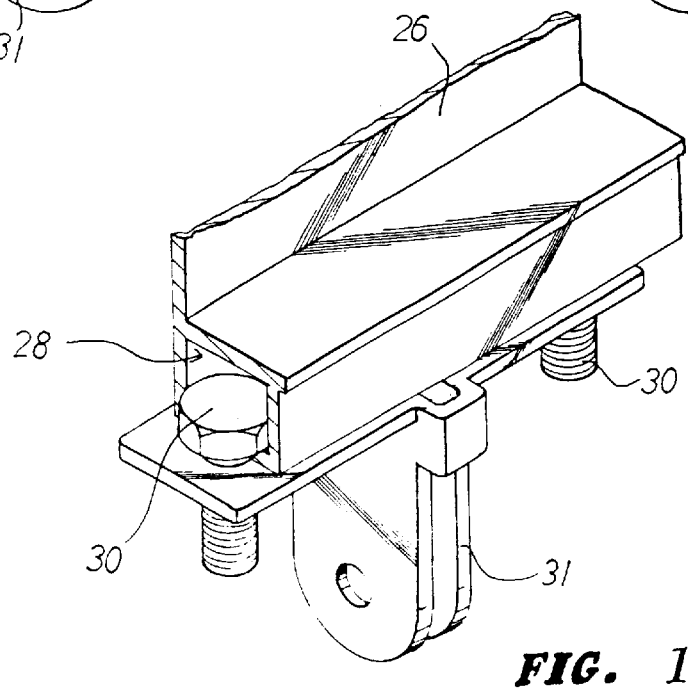
FIG. 13 is a perspective view of the pivot seat of the skylight king post according to the present invention.

Referring to FIG. 11, a skylight securing frame 24 has a top end bent to form a curled hook element 25 to match and insertably engage the curled hook portion 14 of the king post 13. A parallel plate 26 extends from the bottom portion of the securing frame 24 such that a groove 27 is formed therebetween. Additionally, the parallel plate 26 extends beyond the oblique plate 16 of the king post 13 and then downwardly to form a substantially T-shaped insert groove 28. With further reference to FIGS. 12 and 13, the groove 27 receives a skylight corrugated plate 29, whereas the insert groove 28 holds a pivot seat 31 by means of bolts 30. The pivot seat 31 is provided to pivotally connect with a skylight drive link.

Figure 14:
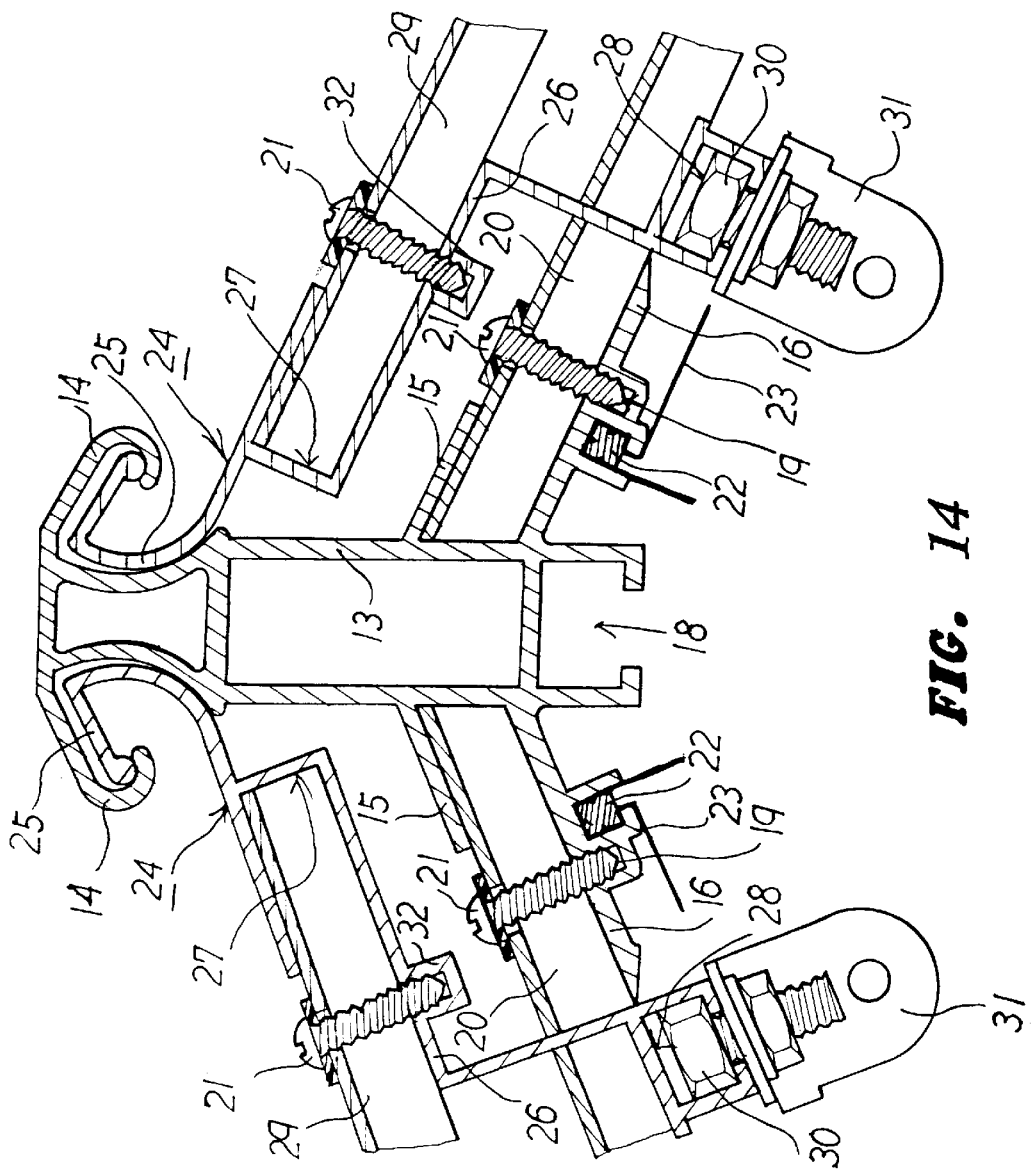
FIG. 14 is still another sectional view of the skylight king post according to the present invention.

Referring to FIG. 14, the parallel plate 26 of the skylight securing frame 24 may also be provided with a recessed groove 32 for securing the skylight corrugated plate 29 using tap bolts 21.

Figure 16:
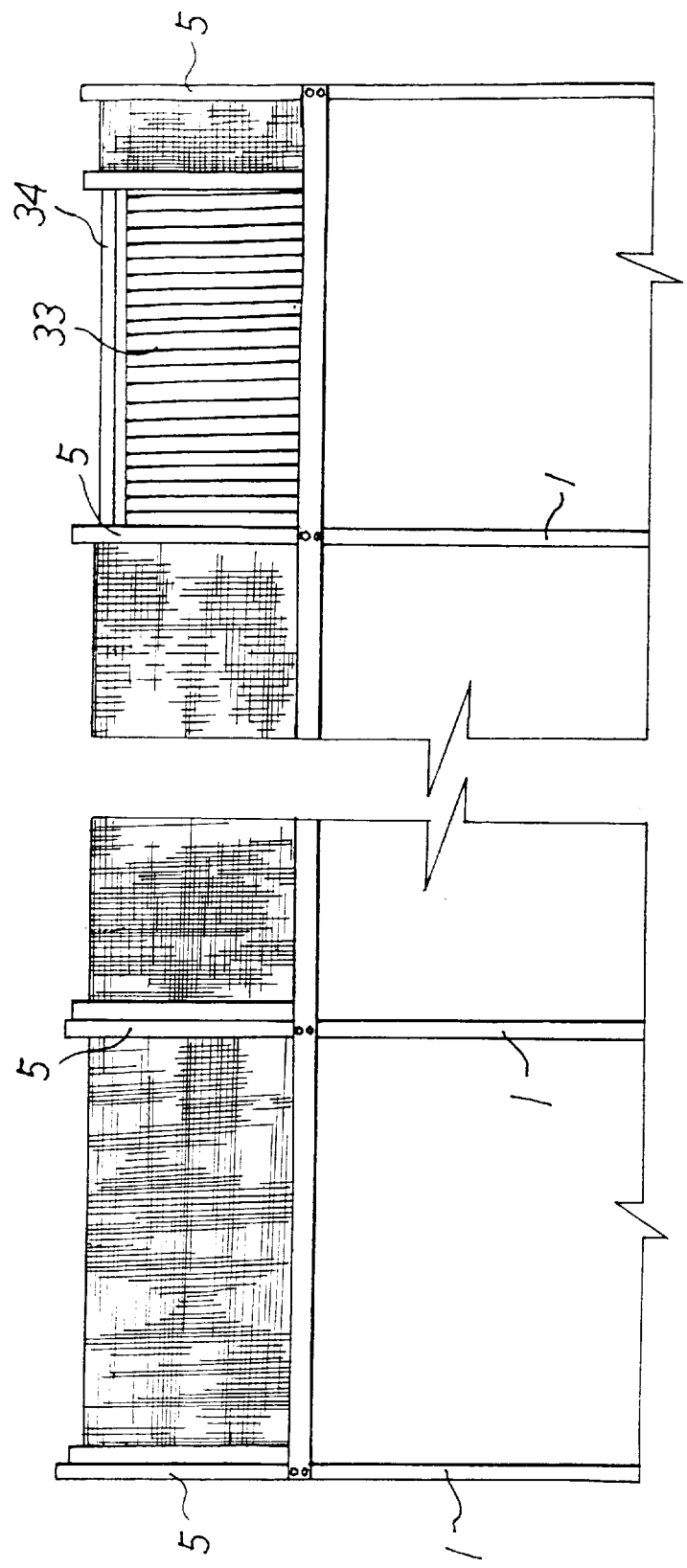
FIG. 16 is a side view of the upper sun-shielding screen according to the present invention.
Figure 17:
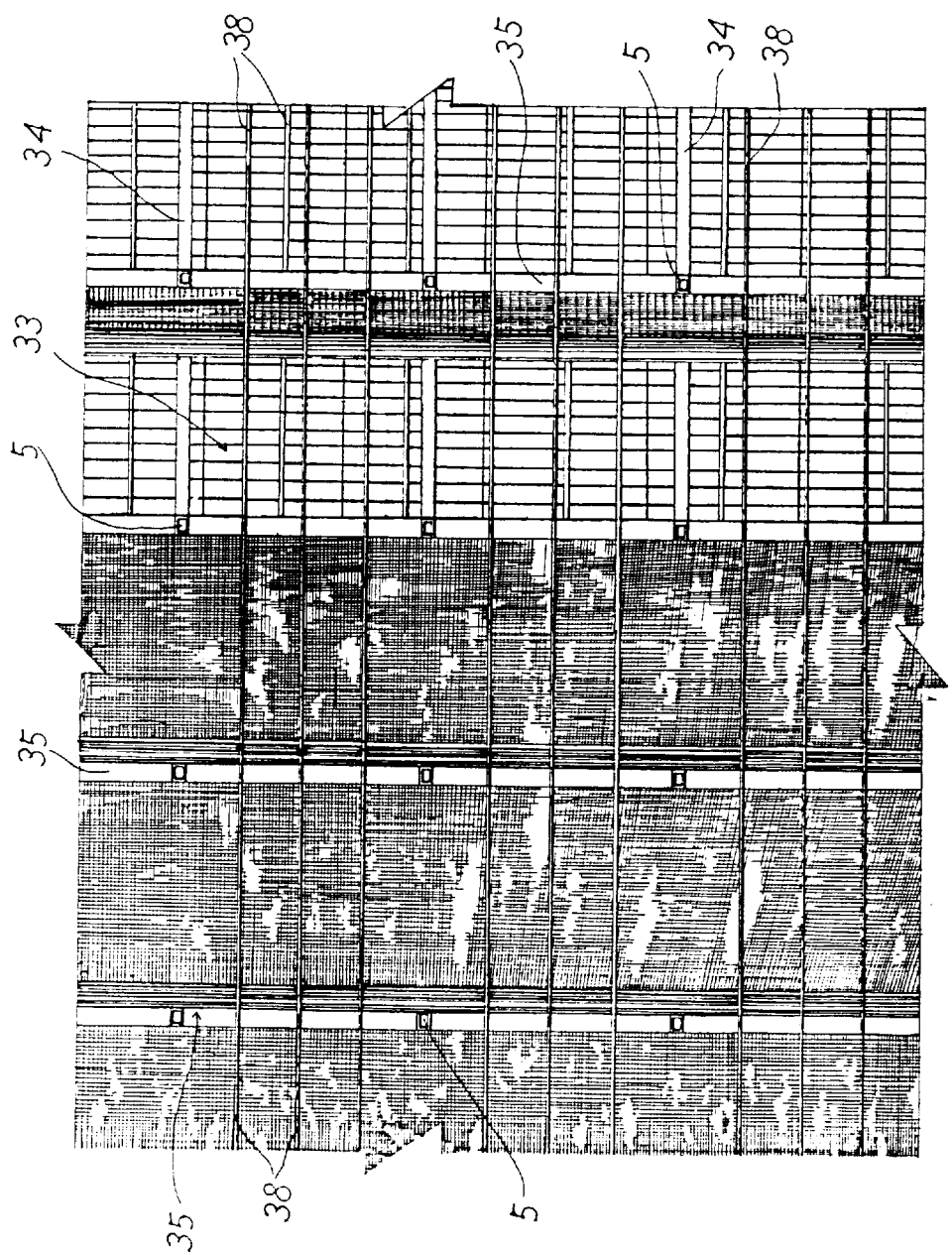
FIG. 17 is a bottom view of the upper sun-shielding screen according to the present invention.

Upper Sun-shielding Screens:

With reference to FIGS. 16 and 17, an upper side of a roof 33 of the greenhouse has longitudinal supports 34 and transverse supports 35 mounted on the studs 5 in a crisscross arrangement. The positions of the longitudinal supports 34 mounted on the studs 5 lower than the transverse supports 35 so as to allow drive rods (to be described hereinafter) to be disposed in different positions.

Figure 18:
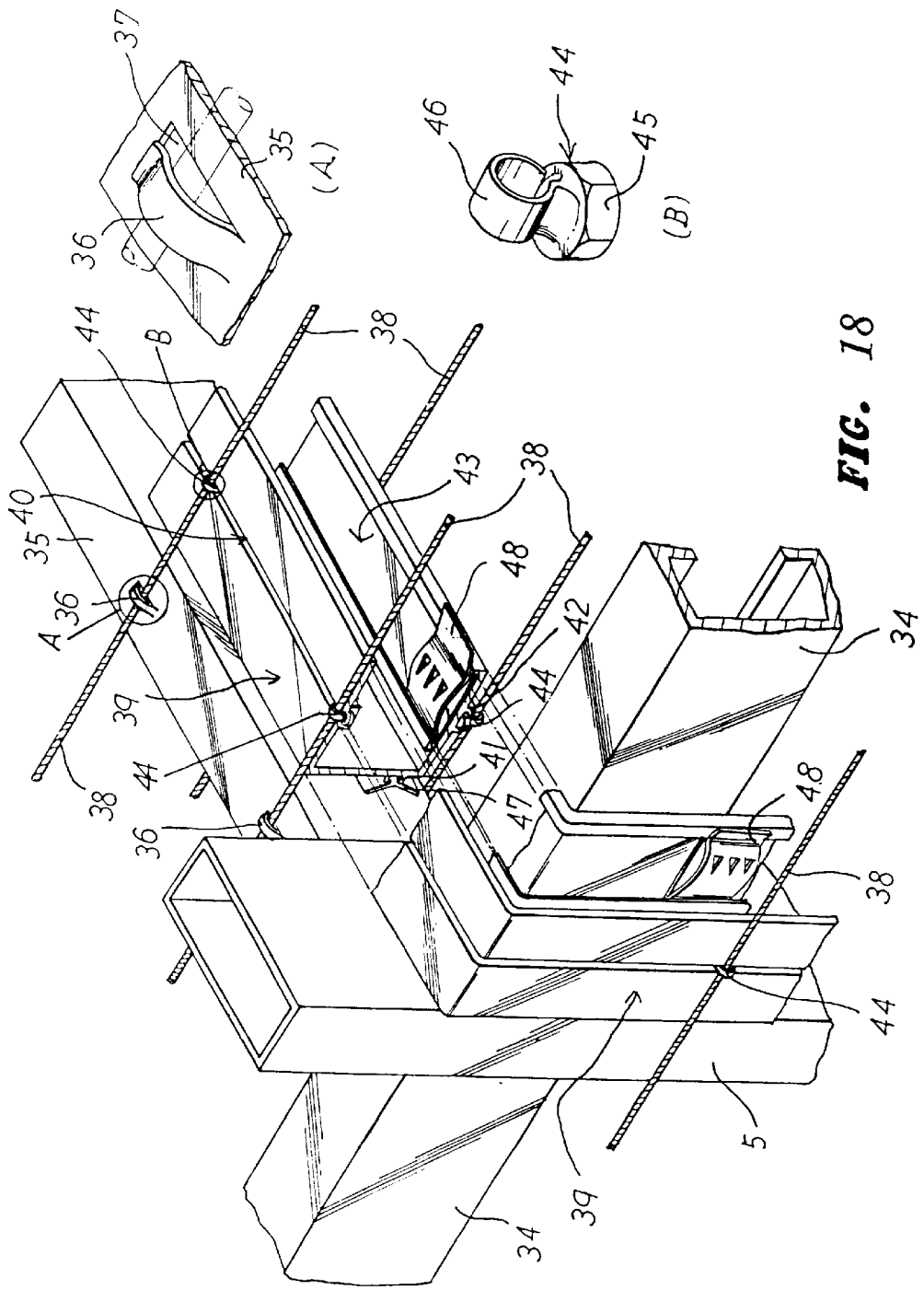
FIG. 18 is a perspective view of the drive bar of the upper sun-shielding screen according to the present invention.
Figure 19:
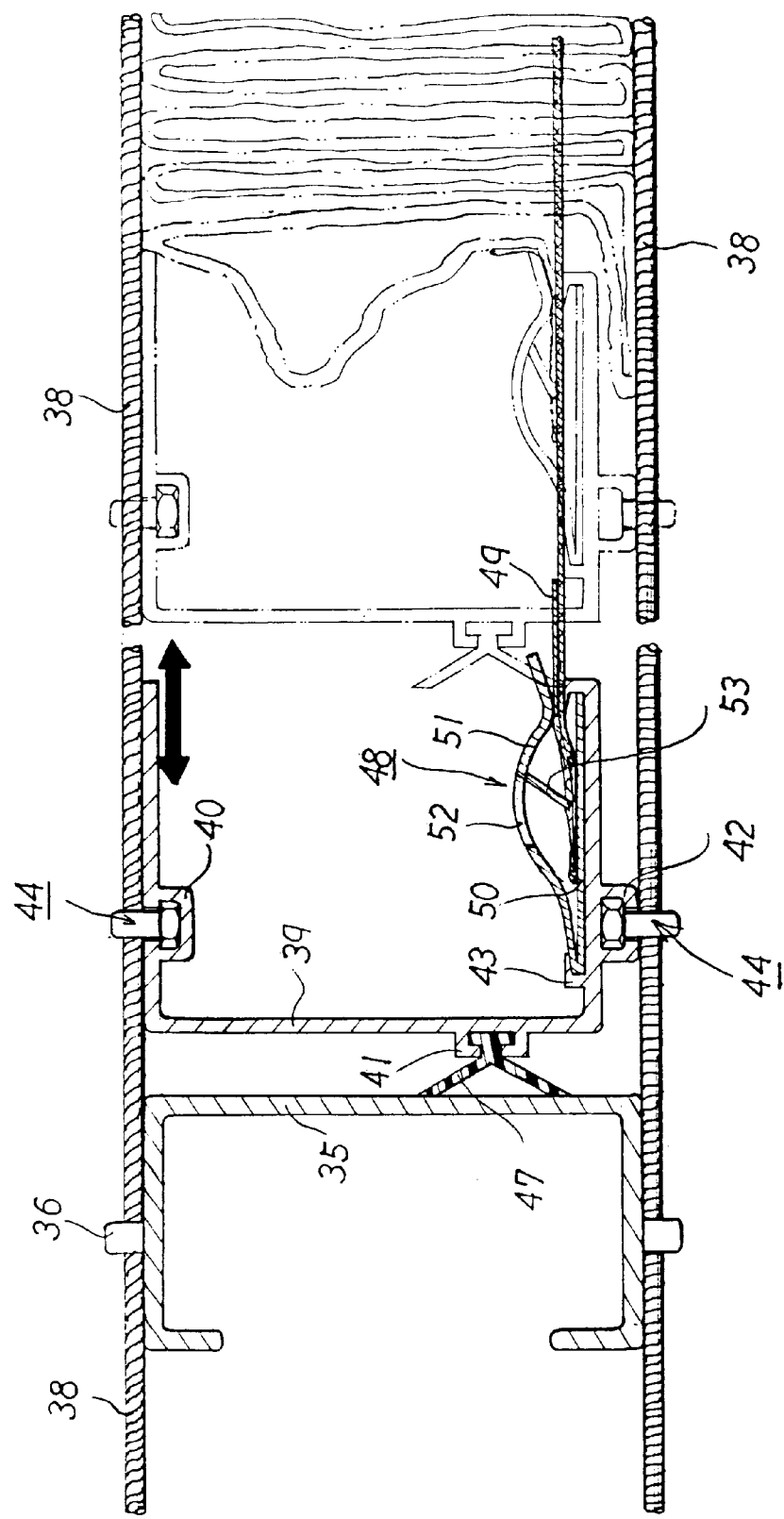
FIG. 19 is a schematic sectional view illustrating operation of the drive bar of the upper sun-shielding screen according to the present invention.

Referring to FIGS. 18 and 19, upper and lower end faces of the transverse supports 35 have a plurality of equidistantly spaced pawls 36 disposed thereon. (The pawls 36 are curved. When the end face of the transverse support 35 is punched to form an inverted U-shaped groove 37, the material at the groove 37 can be directly used to form an undulated pawl 36.) The upper and lower pawls 36 are provided to secure steel wires 38 in a longitudinally parallel manner. In this way, during on-site construction, it is only necessary to connect the two ends of the steel wires 38 and fit them one by one below the pawls 36 and then pressing the front ends of the pawls 36 to achieve a quick fastening effect.

Transverse drive bars 39 are disposed between upper and lower steel wires 38. The drive bars 39 are substantially U-shaped with a recessed T-shaped groove 40 on a top end face thereof, and a projecting T-shaped groove 43 on the bottom portion of the bottom end face thereof. Hanging hooks 44 are then inserted into the T-shaped grooves 40, 42 on the top end face and the bottom end face respectively. (A bottom portion of the hanging hooks 44 may be configured to be a nut portion 45, while a top end is configured to be a flat curved portion 46.) The hanging hooks 44 retain and secure the upper and lower steel wires 38. Rubber strips 47 are then inserted into the T-shaped groove 41 on the back side, and claw plates 48 are inserted into the T-shaped groove 43 on the bottom end face to retain and secure a sun-shielding screen 49.

The claw plate 48 includes an elastic plate 51 extending forwardly and undulatingly from a back end of a base plate 50 of the T-shaped groove 43, a plurality of notches 52 punched in the elastic plate 51, and downwardly extending claws 53 formed by the material at the notches 52 when the latter are being punched. The two ends of each drive rod 49, i.e., on both sides of the greenhouse, respectively bend downwardly and extend to the beams of the greenhouse framework, and are limited by the steel wires 38. The claw plates 48 are also used to retain and secure the sun-shielding screen 49 to form an inverted U-shaped canopy covering the upper side of the greenhouse to enhance the sun-shielding effect of the greenhouse on the sides.

Figure 20:
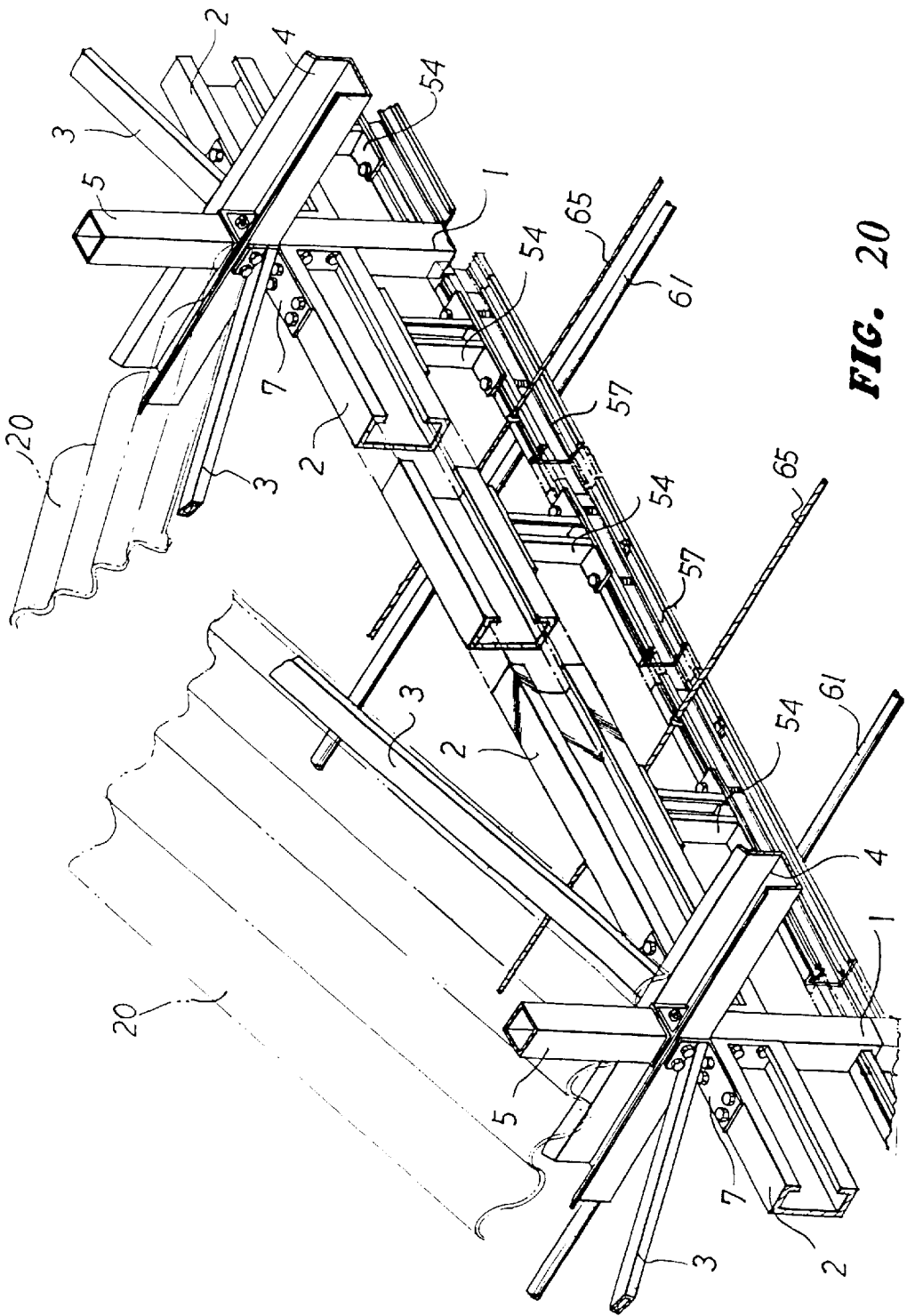
FIG. 20 is a perspective view of the drive bar of the inner sun-shielding screen according to the present invention.
Figure 21:
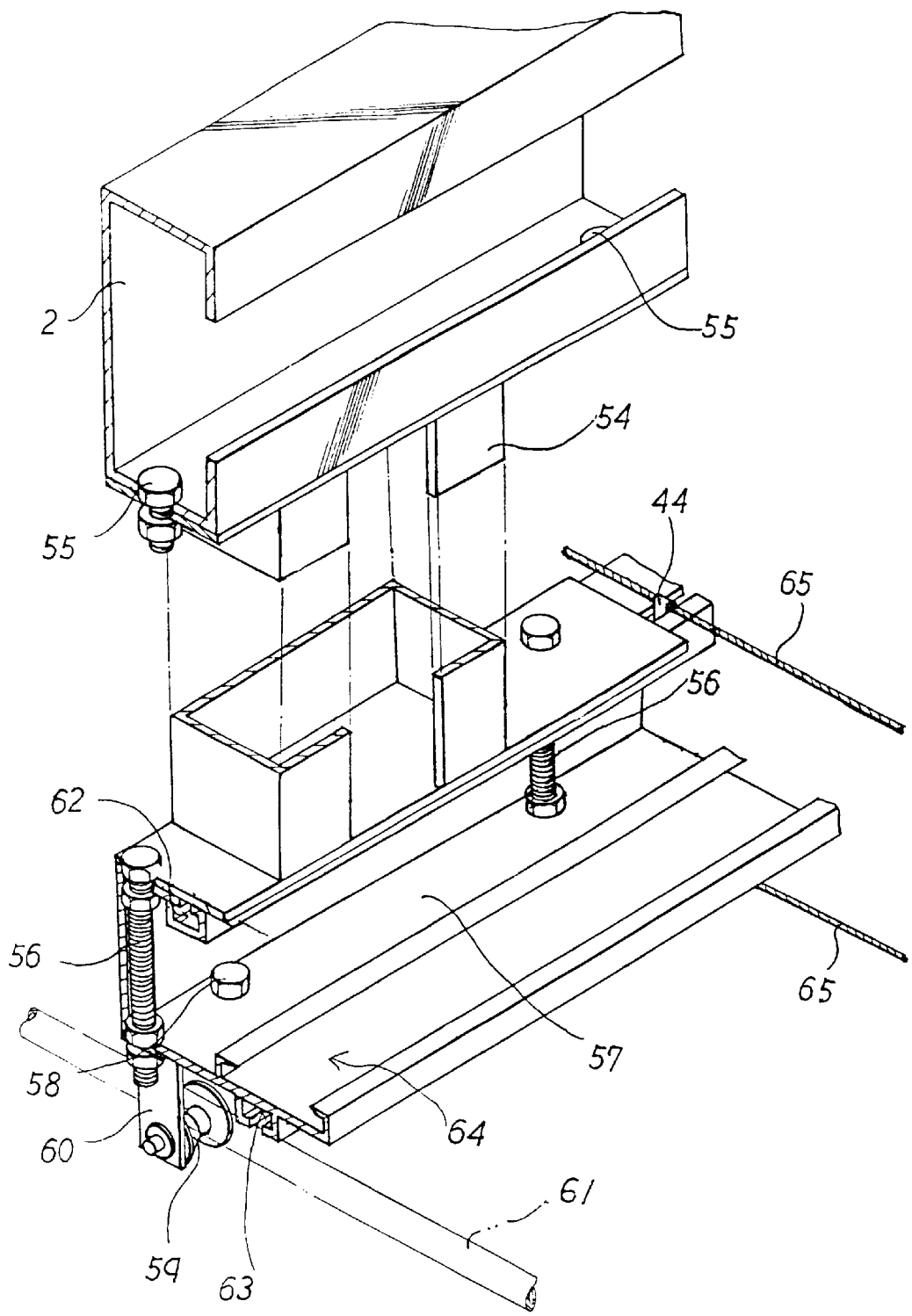
FIG. 21 is a perspective sectional view of the drive bar of the inner sun-shielding screen according to the present invention.

Inner Layer Sun-shielding Screens:

With reference to FIG. 20, the greenhouse framework is constructed by using equi-distantly spaced support posts 1, beams 2 transversely provided on both sides of the top ends of the support posts 1, water troughs 4 longitudinally provided on the top ends, rafters 3 having L-shaped securing plates 7 welded to bottom ends to thereby secure them to the beams 2 below, studs 5 of the upper sun-shielding screen erected upwardly on top ends of the support posts 1 and the water troughs 4 by the securing plates 7 on both sides by bolts, with corrugated plates 20 spread on top.

Figure 3:
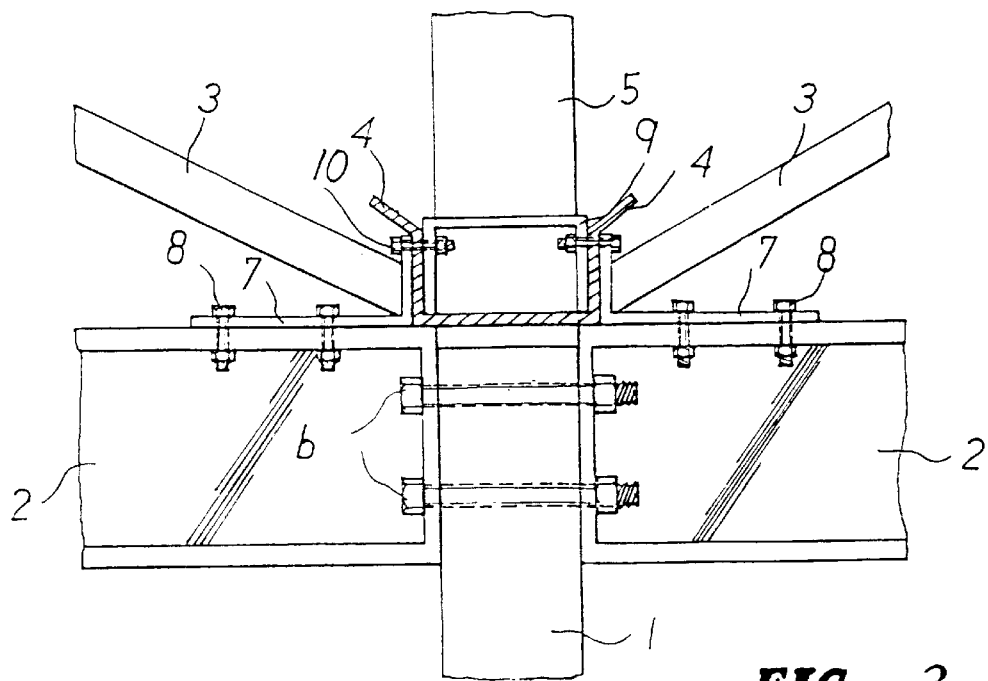
FIG. 3 is a plan view of the framework joints according to the present invention.

A plurality of I-shaped connecting seats 54 (see FIGS. 2 and 3 as well) have top ends thereof secured to the bottom portion of the beams 2 between adjacent support posts 1 using bolts 55. A bottom end of the connecting seat 54 is then secured to an elongated drive bar 57 having a U-shaped cross section by using bolts 56 that pass through the drive bar 57. In addition, when securing the drive bars 57 using bolts 56 on the outer sides of the connecting seats 54 on both ends of the drive bars 57, a bolt 58 is used to secure a securing frame 60 having a pulley 59 that is utilized to match a longitudinally oriented guide bar 61.

Figure 22:
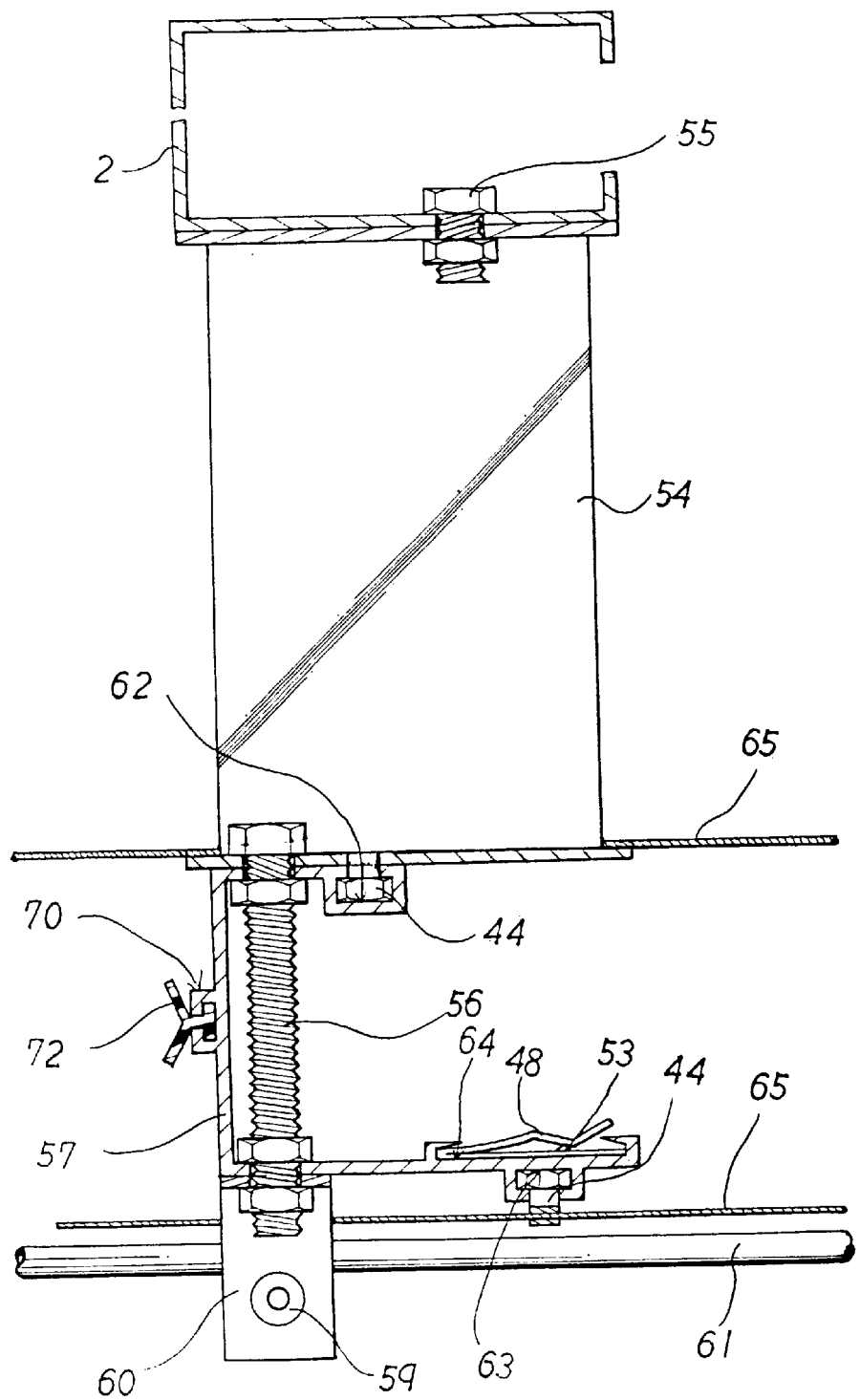
FIG. 22 is a sectional view of the drive bar of the inner sun-shielding screen according to the present invention.
Figure 23:
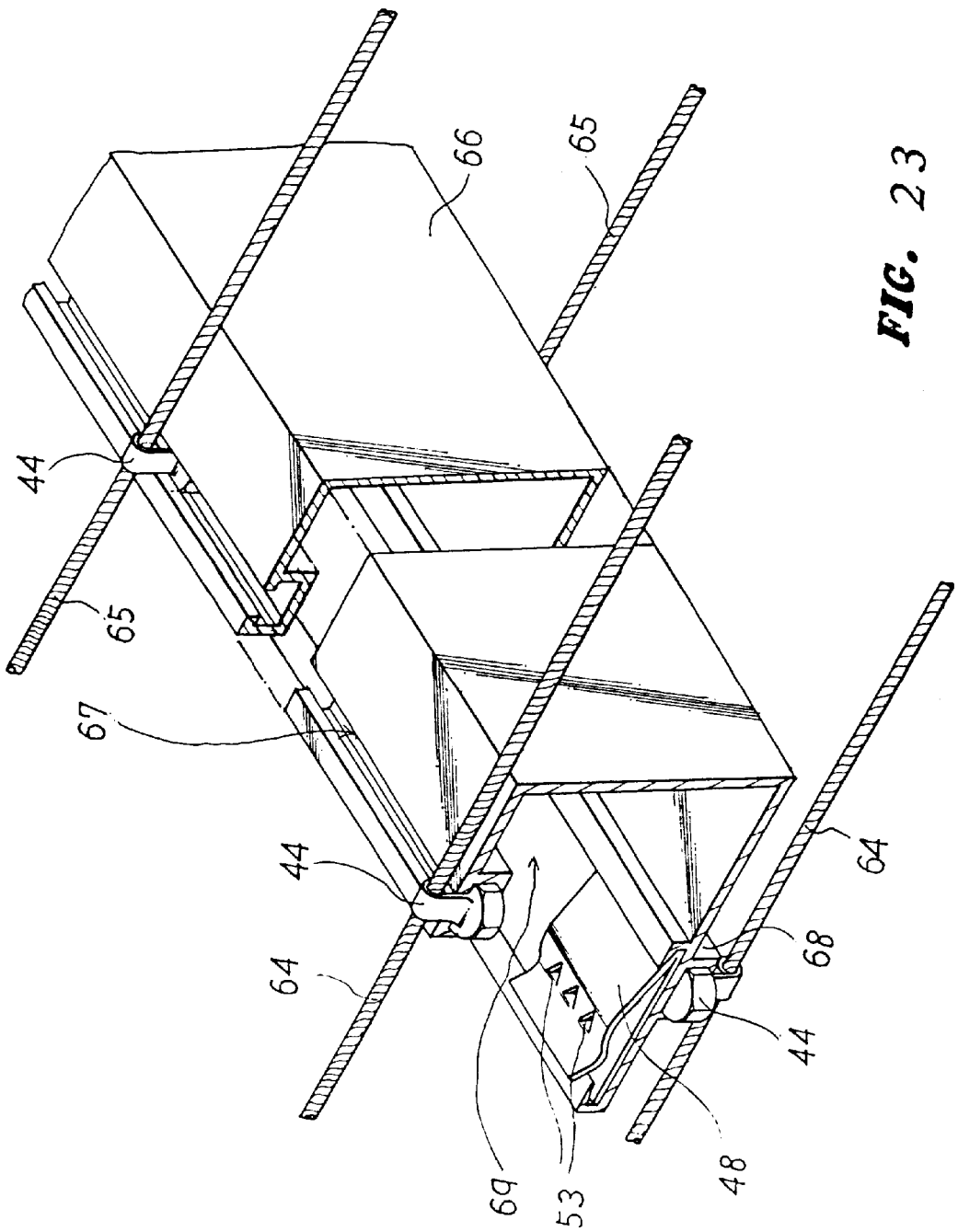
FIG. 23 is a perspective view of the drive bar of the inner sun-shielding screen according to the present invention.

The elongated drive bar 57 has a U-shaped cross section. Its top end is provided with a recessed T-shaped groove 62; a bottom end face is provided with a projecting T-shaped groove 63 on a bottom portion thereof. The top side is also provided with a wider projecting T-shaped groove 64. Upper and lower ends of the drive bar 57 have a plurality of parallel longitudinally oriented steel cables (ropes) 65 that are equi-distantly spaced apart from each other. Therefore, the T-shaped grooves 62, 63 on the upper and lower ends of the drive bar 57 can receive flat curved hanging hooks 44 that have a larger head end (such as the head of a bolt) and that extend upwardly. The hanging hooks 44 retain the steel cables 65. In addition, the wider T-shaped groove 64 on the top side of the bottom end face of the drive bar 57 can receive the claw plate 48 (see FIG. 22). The claw plate 48 has a rectangular base plate so that it can be insertably held in the T-shaped groove 64. A rear end of the claw plate 48 extends to form a continuous curved elastic plate, with a plurality of tapered claws 53 extending downwardly.

The drive bar 57 is secured below the beam 2 by means of the connecting seat 54. A transverse drive bar 66 is disposed between upper and lower steel cables 65 between two adjacent beams 2. Like the elongated drive bar 57, the transverse drive bar 66 is likewise elongated and has a U-shaped cross section. Besides, T-shaped grooves 67, 68, 69 are respectively formed on the top and bottom ends for receiving hanging hooks 44 for retaining the steel cables 65. The movable drive bar 66 is opposite to the claw plate 48 and the securing drive bar 57 and moves along with the longitudinal steel cable 65. During displacement of the movable drive bar 66, if the levelness of the steel cable 65 is not correct, the hanging hook 44 in the T-shaped grooves 67, 68 can be slidably displaced in a suitable manner to achieve smooth displacement.

Figure 24:
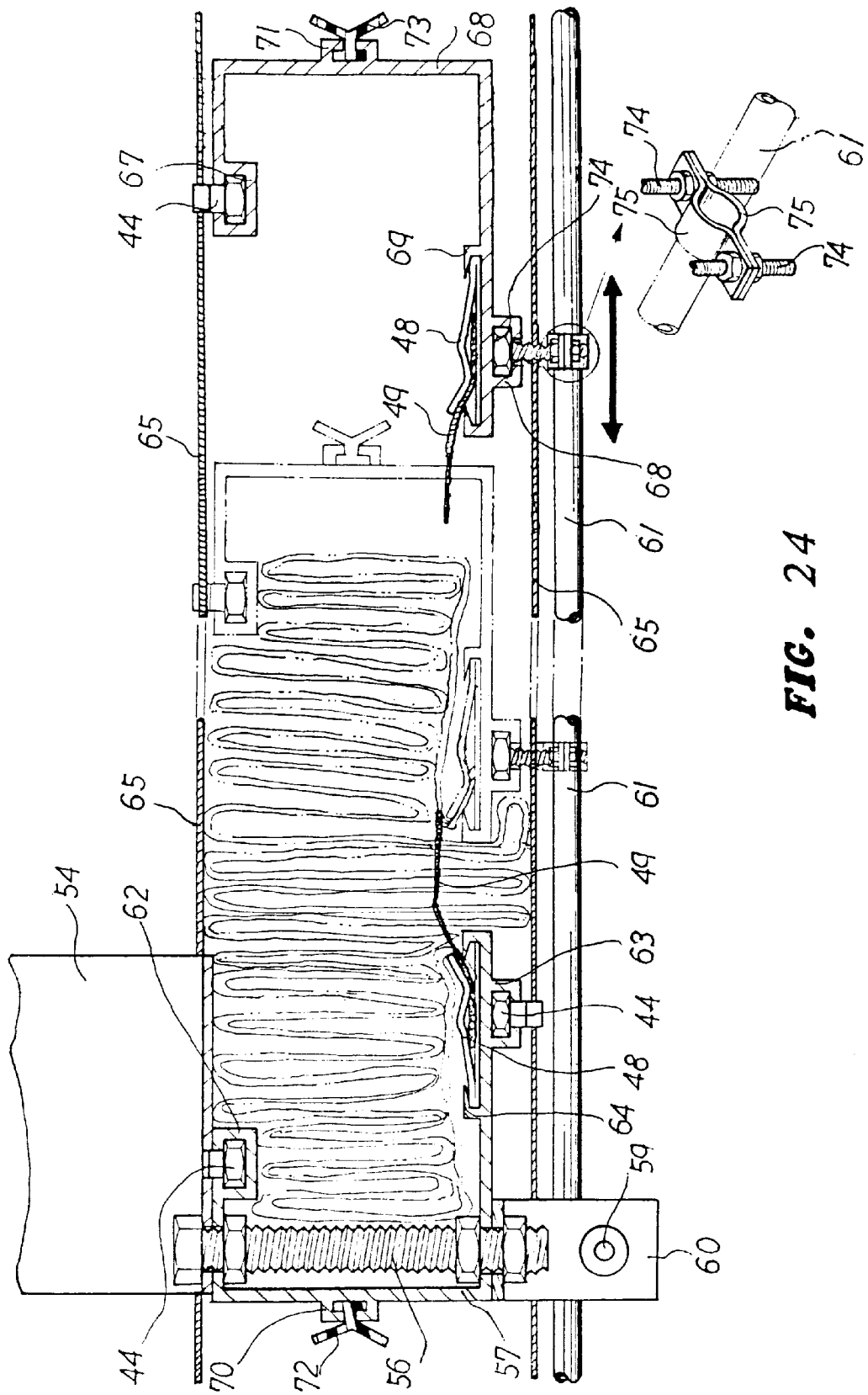
FIG. 24 is a schematic sectional view illustrating operation the drive bar of the inner sun-shielding screen according to the present invention.

Furthermore, as shown in FIG. 24, the sides of the securing drive bar 57 and the movable drive bar 66 may also be provided with projecting T-shaped grooves 70, 71 for receiving rubber strips 72, 73 to serve as a buffer during possible collision and to ensure closure.

With reference to FIG. 24, the securing drive bar 57 and the movable drive bar 66 are oppositely arranged between upper and lower steel cables 65. At the two ends of the movable drive bar 66 opposite to the guide bar 61, the T-shaped groove 68 on the bottom end face receives bolts 74 to secure a clamping plate 75 so as to secure the guide bar 61. The claw plates 48 inserted into the T-shaped grooves 64, 69 on the top face of the bottom end face of the securing drive bar 57 and the movable drive bar 66 respectively use the claws 53 to engage the two ends of the sun-shielding screen 49. Therefore, when the guide bar 61 is driven by a driving system, it can bring the movable drive bar 66 to slidably displace following the steel cable 65 so as to achieve closure or opening of the sun-shielding screen 49. Furthermore, as the sun-shielding screen 49 is limited by the upper and lower steel cables 65, it will not collapse or swell upwardly to result in entanglement. Besides, the oppositely facing drive bars 57 and 66 can accommodate the sun-shielding screen 49 in the space therebetween after they are closed, thus achieving a nice appearance and space reduction.

Figure 25:
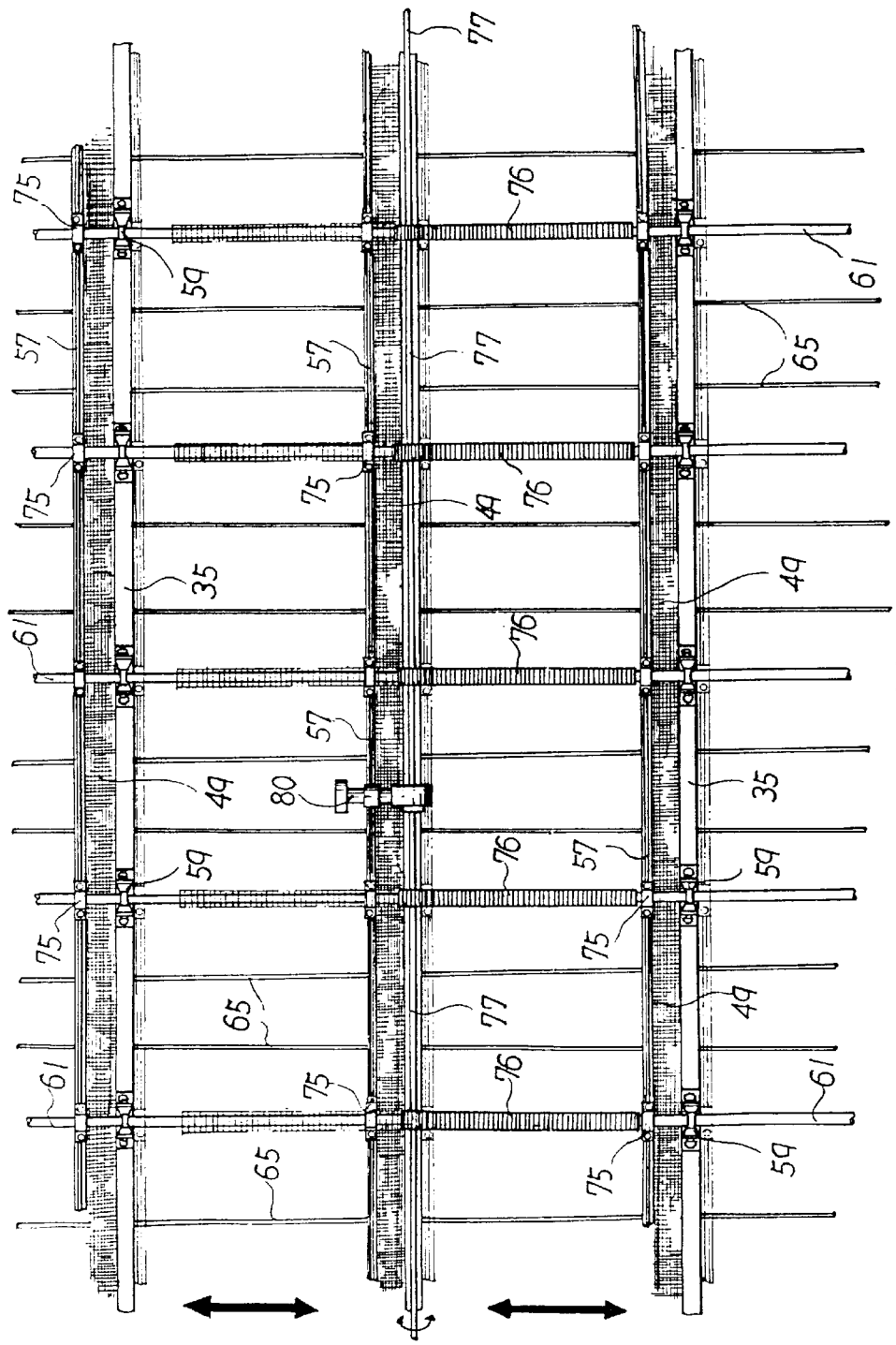
FIG. 25 is a bottom view of the upper sun-shielding screen driving system according to the present invention.
Figure 26:
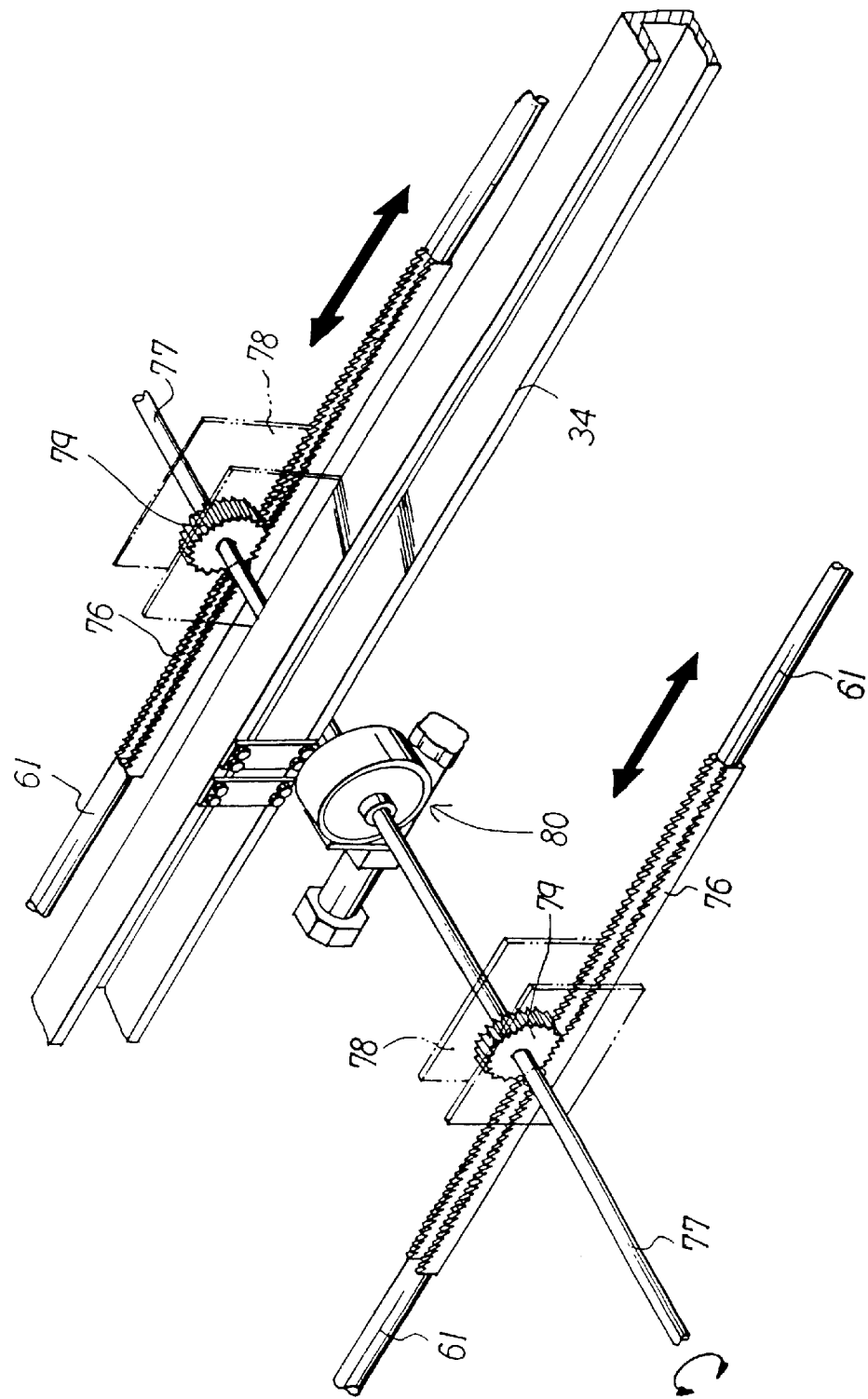
FIG. 26 is a bottom perspective schematic view of the upper sun-shielding screen driving system according to the present invention.
Figure 27:
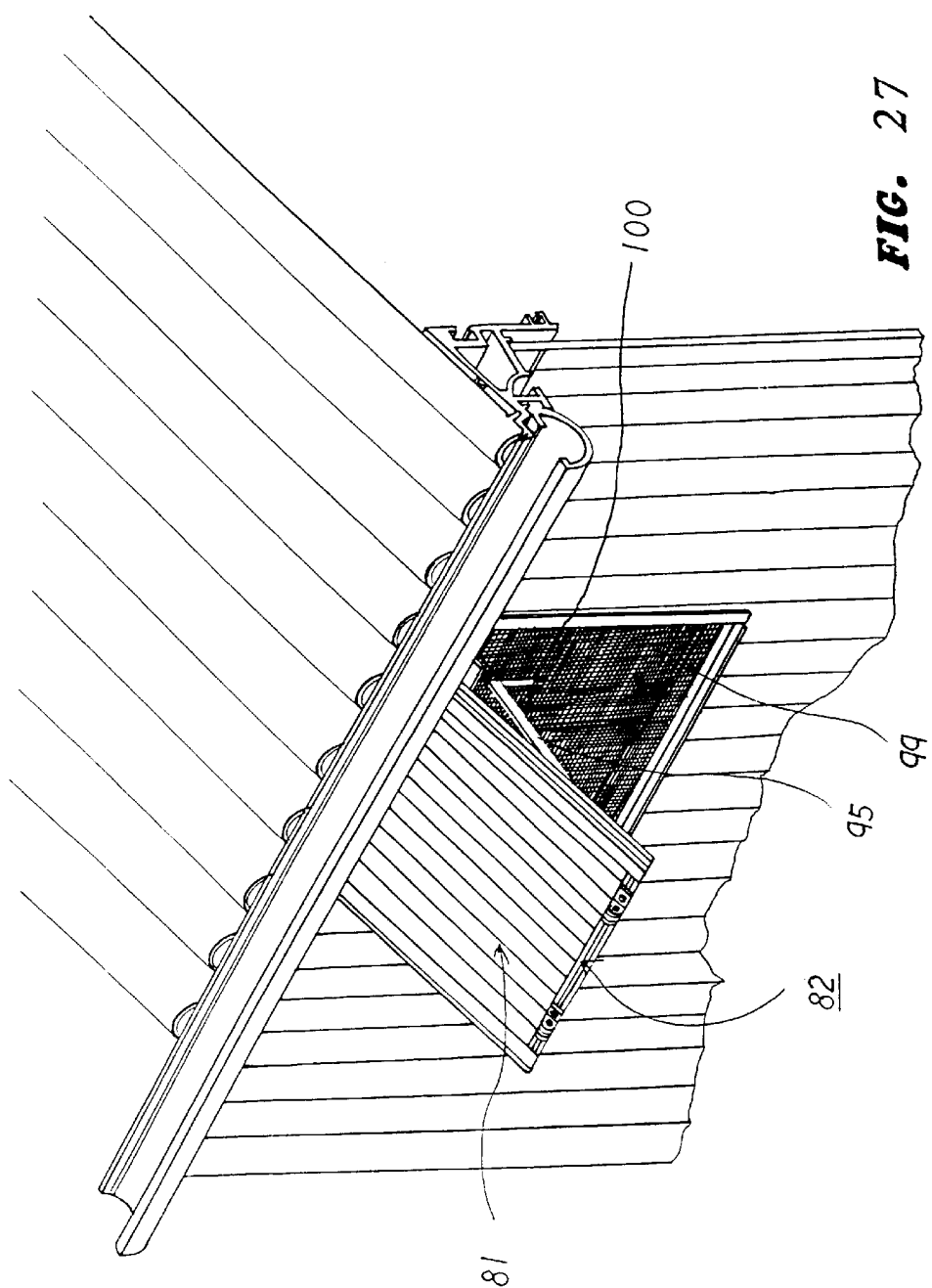
FIG. 27 is a perspective view of the side window according to the present invention.

Sun-shielding Screens Driving System:

Referring to FIG. 25, the bottom portion of the transverse supports 35 and the bottom portion of the drive bar 57 are equi-distantly provided with opposed pulleys 59. The pulleys 59 are connected to the longitudinal guide bars 61 that are arranged in a parallel manner and perpendicular to the transverse supports 35. The drive bars 39, 57 of each sun-shielding screen 49 that are parallel to the transverse supports 35 are secured on the guide bars 65 using clamping plates 75. The middle of each guide bar 61 is connected to a rack 76 that has a U-shaped cross section and that has a length slightly larger than the extended travel distance of the sun-shielding screen. A transverse rotary shaft 77 is secured at one end of the rack 76 at the bottom portion of the support 35 in a perpendicular relation with the rack 76 of each guide bar 61. A gear 79 is secured on the rotary shaft 77 by using securing plates 78 so as to engage the rack 76 (see FIG. 26). The middle of the rotary shaft 77 is driven by a speed reduction motor 80 secured on the support 34.

In view of the aforesaid, it is not only adapted to drive the upper sun-shielding screen of the greenhouse, but it is also adapted to drive the inner layer sun-shielding screen of the greenhouse. By using the speed reduction motor 80 to drive the rotary shafts 77, and utilizing the gears 79 on the rotary shafts 77 to drive the racks 76, all the guide bars 61 can be synchronously brought to slide on the pulleys 59, thereby driving all the drive bars 57, 66 to cause the sun-shielding screen 49 to perform opening and closing reciprocating movements.

Figure 29:
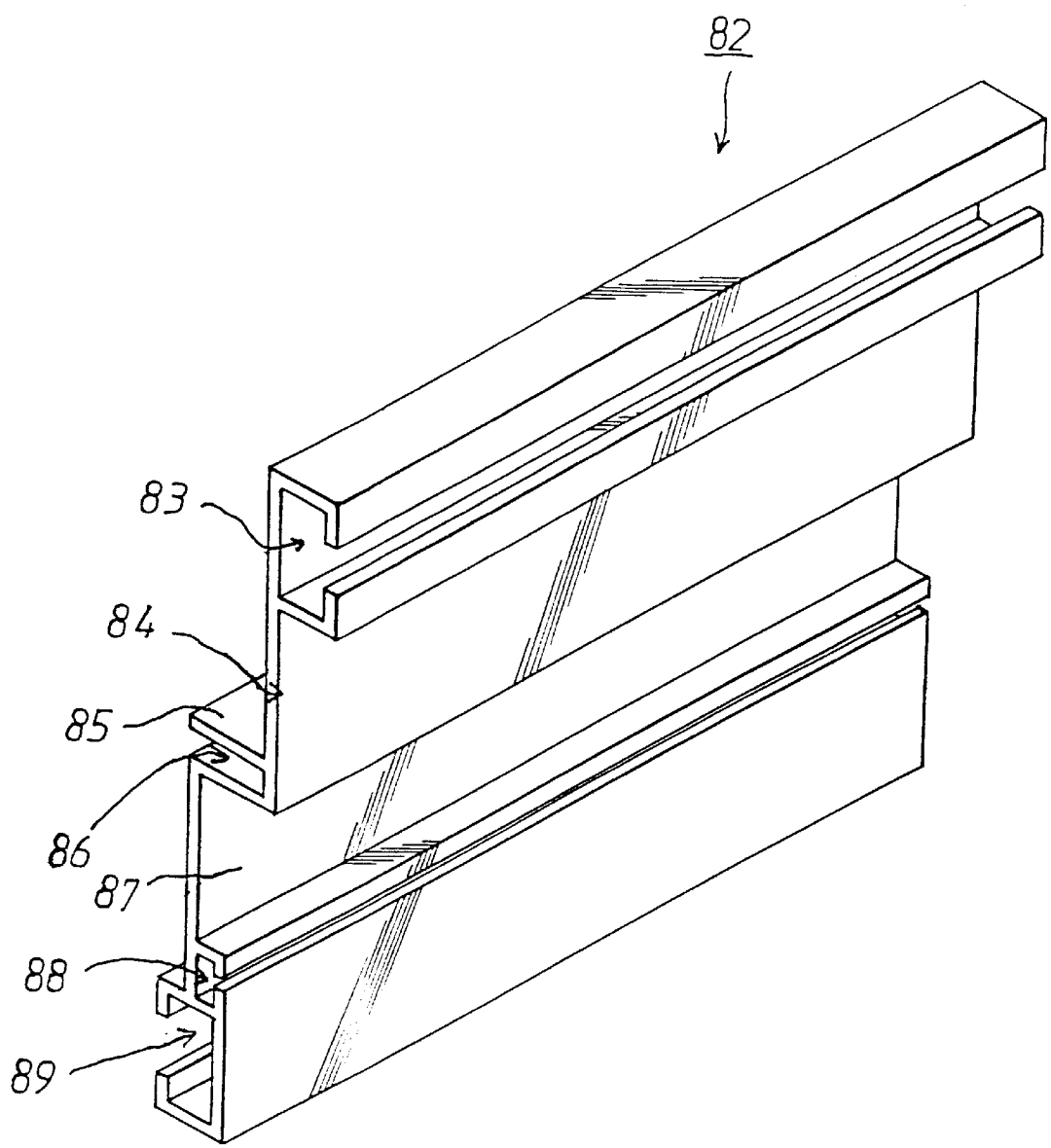
FIG. 29 is a perspective view of the side window bottom frame bar according to the present invention.

Bottom Frame Bars of Skylights and Side Windows Referring to FIG. 29, a bottom frame bar 82 according to the present invention has a T-shaped insert groove 84 formed on a top end of a cross section thereof towards an inner side. The bottom portion of the insert groove 83 extends downwardly to form a planar plate 84. The bottom end of the planar plate 84 has an upright plate 85 erected at an outer side thereof such that a suitable clearance is defined between the planar plate 84 and the upright plate 85. The planar plate 84 further extends outwardly and bends to be parallel to the upright plate 85, thereby forming a screw insert slot 86 with the upright plate 85. It further extends downwardly to form a plane plate 87. A smaller T-shaped insert groove 88 is formed on an inner side at the bottom end of the plane plate 87, and a larger T-shaped insert groove 89 is formed on the outer side connected to the bottom end.

Figure 30:
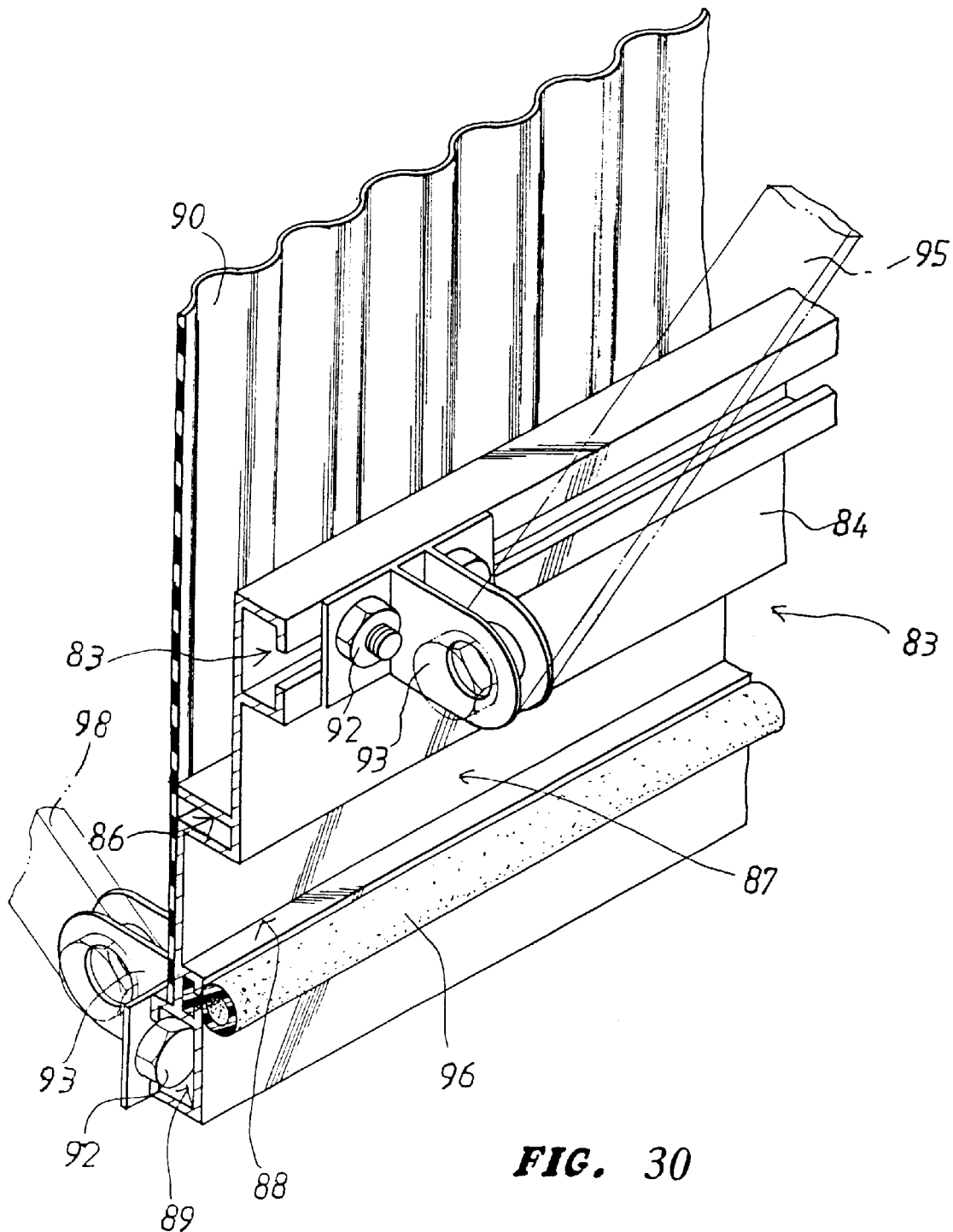
FIG. 30 is a perspective sectional view of the side window bottom frame bar according to the present invention.
Figure 31:
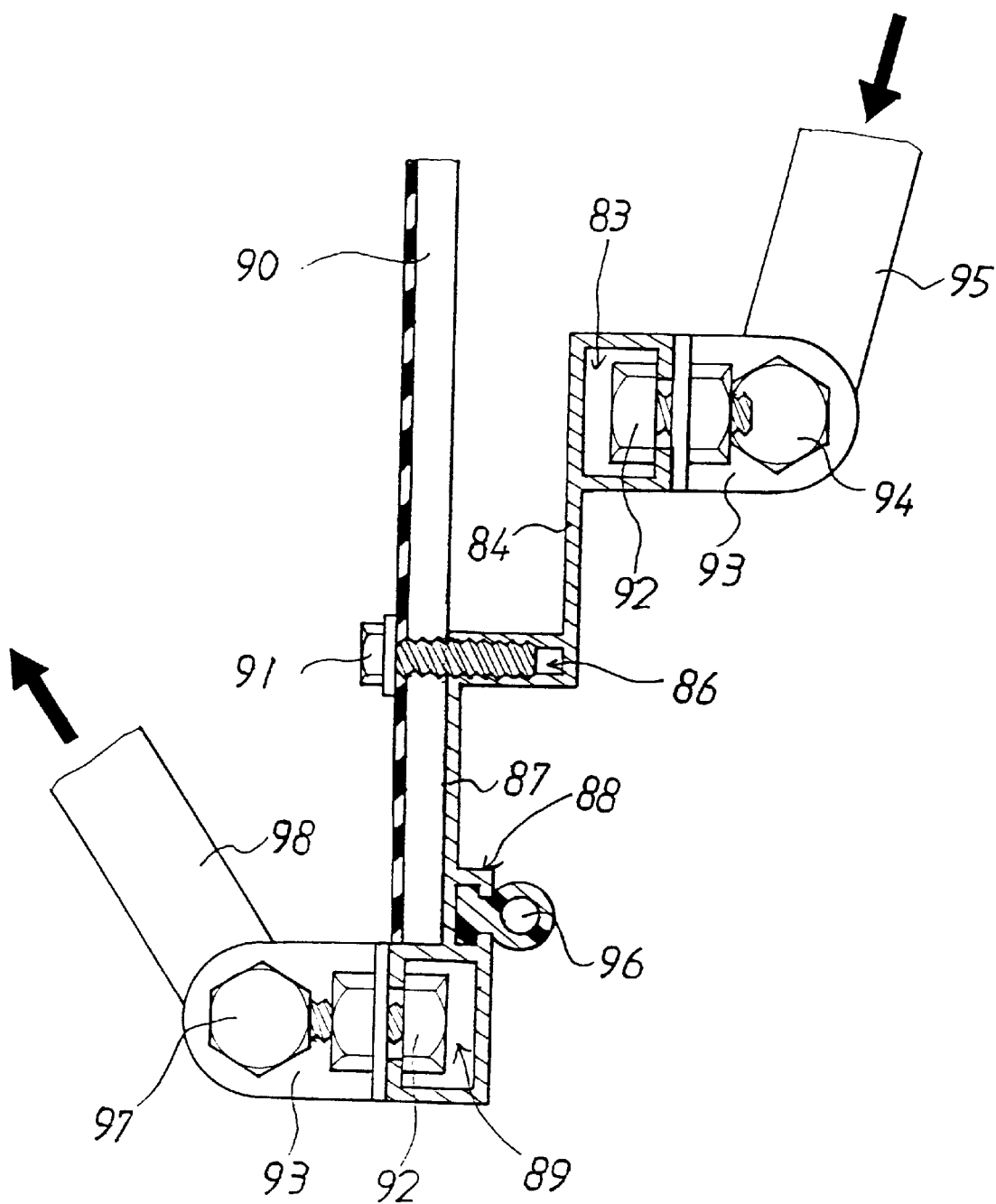
FIG. 31 is a sectional view of the side window bottom frame bar according to the present invention.

Referring to FIGS. 30 and 31 as well, a corrugated plate 90 is coupled to the outer side of the plane plate 87. Securing screws 91 are used to secure the corrugating plate 90 to the bottom frame bar 82 at the screw insert slot 86. The T-shaped insert groove 83 on the inner side of the top end receives bolts 92 to secure a pivot seat 93 so to utilize a bot 94 to connect pivotally a support bar 95. The smaller T-shaped insert groove 88 on the inner side of the bottom end receives a buffer enclosed rubber strip 96, whereas the T-shaped insert groove 89 on the outer side of the bottom end of the bottom frame bar 82 receives bolts 92 to secure the pivot seat 93 so as to utilize bolts 97 to connect pivotally a pulling bar 98.

In order to prevent entry of insects and pests into the greenhouse via the skylight 29 and the side window 81 when the latter are opened, a support bar 95 is provided at the skylight 29 and side window 81 to open them from the inside of the greenhouse, and an opening has to be left in the insect screen 99 to allow the support bar 95 to pass through to support the side window 81, creating an opening 100 in the insect screen 99, hence unable to keep out insects and pests. Therefore, that the bottom frame bar 82 can be pulled from the outside is more useful.

In the present invention, the screw insert slot 86 receives screws 91 to secure the corrugated plate 90, and the T-shaped insert groove 88 receive the rubber strip 96 to attribute a buffering and sealing effect to the window frame during opening and closing. Furthermore, both inner and outer sides are respectively provided with T-shaped insert grooves 83, 89 to allow selective insertion of bolts 92 to secure the pivot seat 93 to support the support bar 95 or pulling bar 98.

Figure 28:
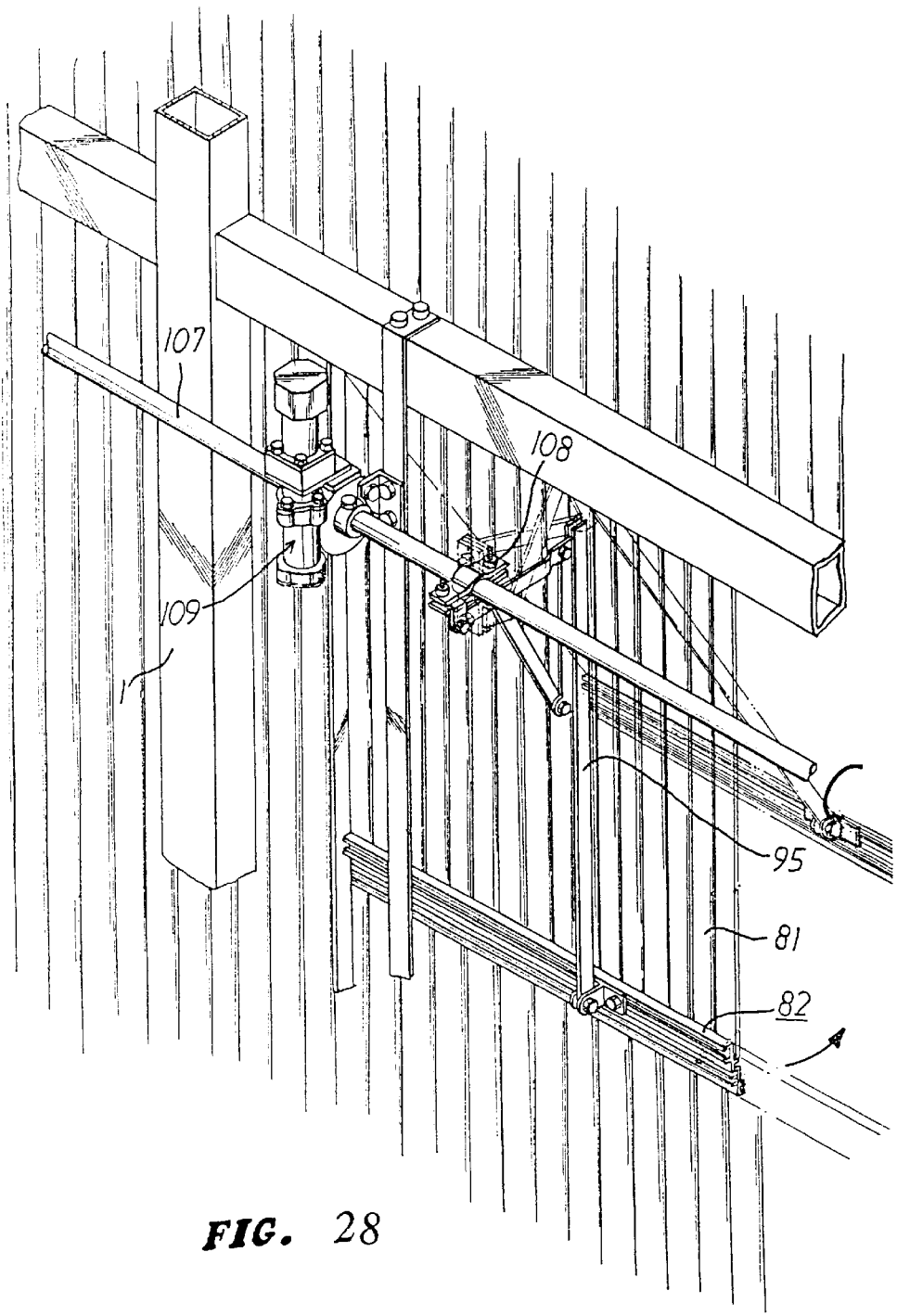
FIG. 28 is another perspective view of the side window according to the present invention.
Figure 32:
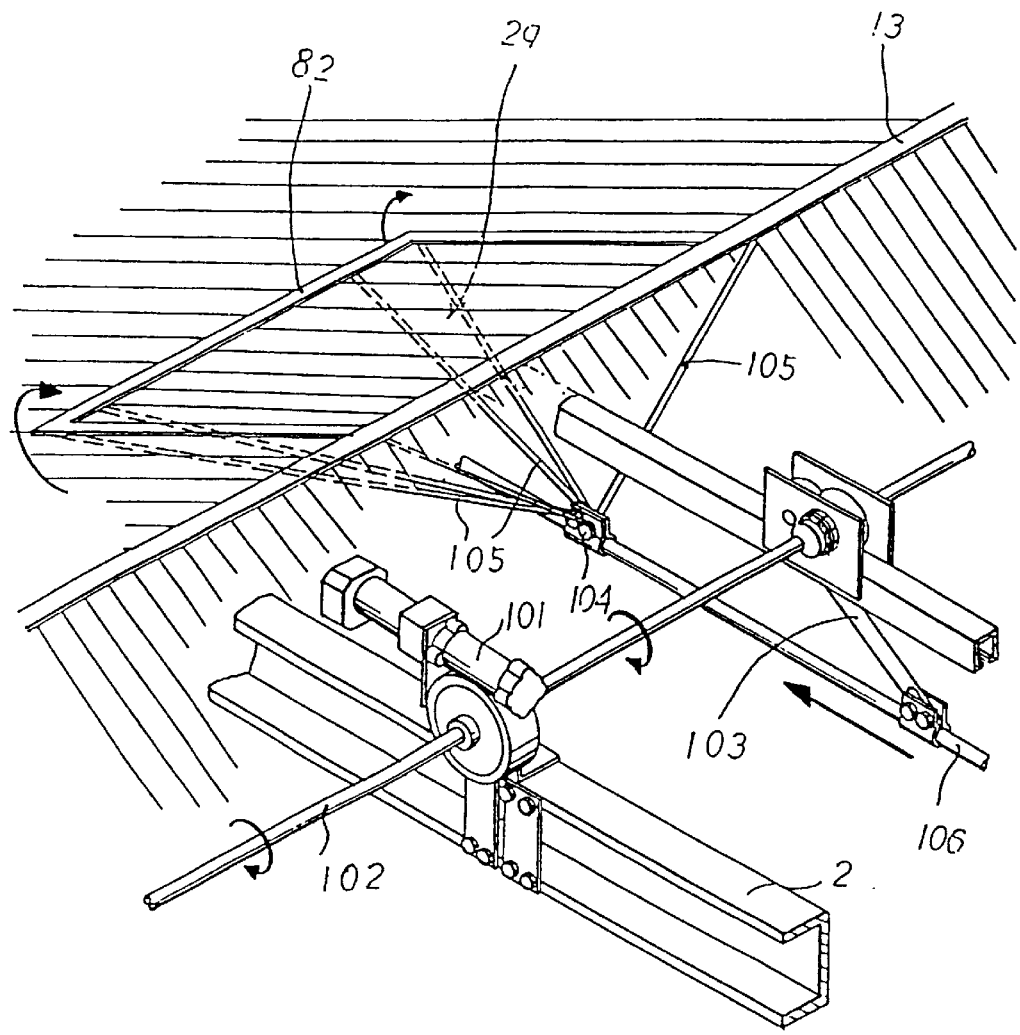
FIG. 32 is a perspective schematic view of the skylight driving system according to the present invention.

Referring to FIGS. 28 and 32, a speed reduction motor 101 is secured on the beam 2 to drive a rotary shaft 102 that is parallel to a main shaft 13. A link 103 on the rotary shaft 102 is used to drive a transverse shaft 106. On the transverse shaft 106 opposite to each skylight 29, a pivotal connecting sleeve 104 is used to connect pivotally a plurality of support bars 105 to drive the frame bar 82. The driving of the side window 81 also utilizes a motor 109 to drive a shaft 107, and a pivotal connecting sleeve 108 is provided on the shaft opposite to the side window 81 to connect pivotally the support bar to achieve opening or closing of the side window 81.

Figure 33:
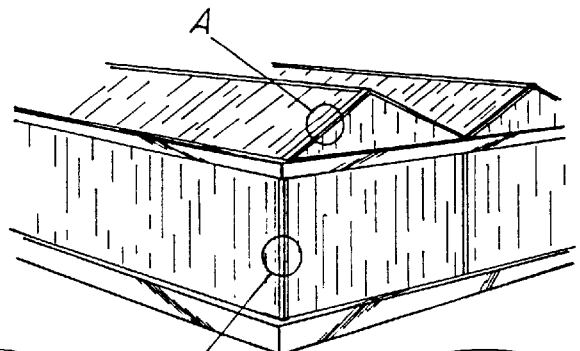
FIG. 33 is a schematic view of the outer appearance of the greenhouse according to the present invention.

Trimming Aluminum Bars:

Referring to FIG. 33, trimming aluminum bars are used at the four corners a as well as front and rear ends of the roof of the greenhouse to trim the right-angled joints at the corners.

Figure 34:
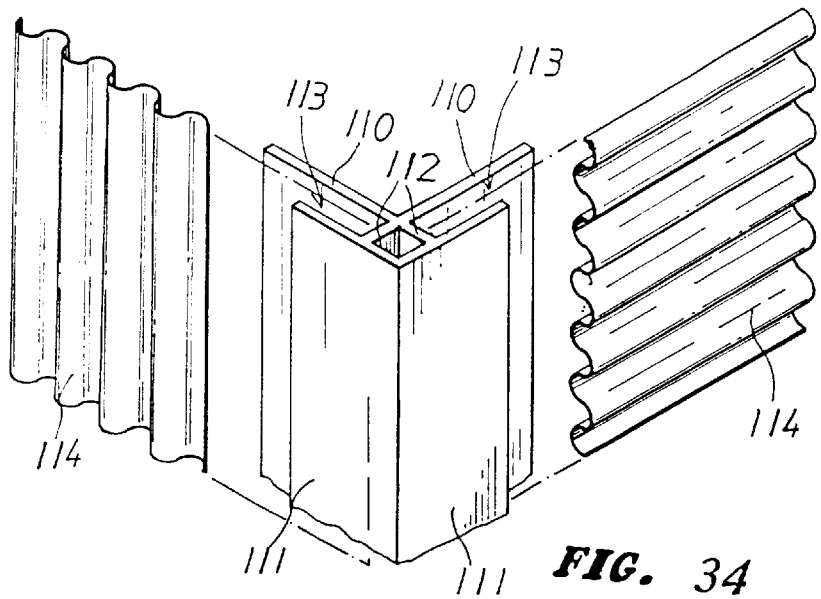
FIG. 34 is a perspective exploded view of the trimming aluminum bar according to the present invention.

With further reference to FIG. 34, the aluminum bar is elongated. From the cross section as shown, it includes an inner layer plate 110 and an outer layer plate 111 with partition plates 112 connecting them in a parallel relationship, such that clearances 113 are defined therebetween. Besides, the inner layer plate 110 has an axial length longer than that of the outer layer plate 111.

Figure 35:
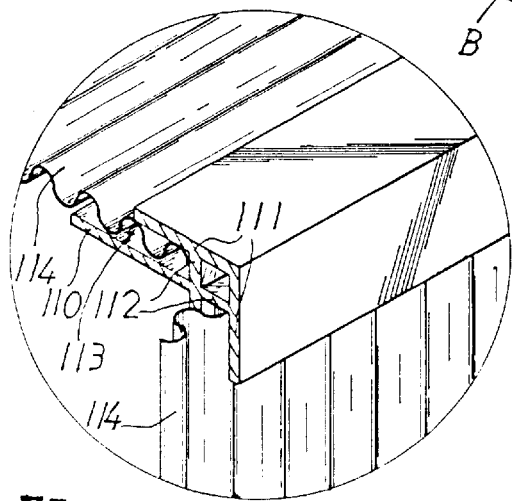
FIG. 35 is a perspective sectional view of the trimming aluminum bar according to the present invention.
Figure 36:
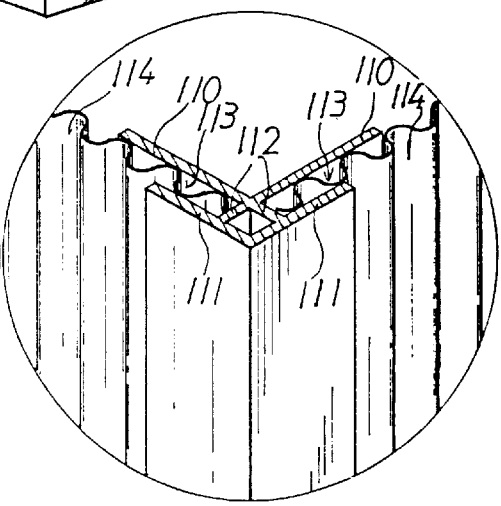
FIG. 36 is a perspective sectional view of the trimming aluminum bar according to the present invention.

The side of edge of a corrugated plate 114 can be inserted into the clearance 113 and be retained therein. The angular edges or joints of the corrugated plates 114 on the oblique surfaces of the roof and the corrugated plates on the front and rear end faces on the rafters are enclosed by the trimming aluminum bars (as shown in FIG. 35). At the four corners where the corrugated plates 114 are joined, the trimming aluminum bars may also be provided for enclosure purposes, as shown in FIG. 36.

The arrangement of the trimming aluminum bars allows closure of the edges of the corrugated plates at the angular joints or corners of the greenhouse, which not only achieves a nice appearance but also facilitates construction and operation.

Figure 37:
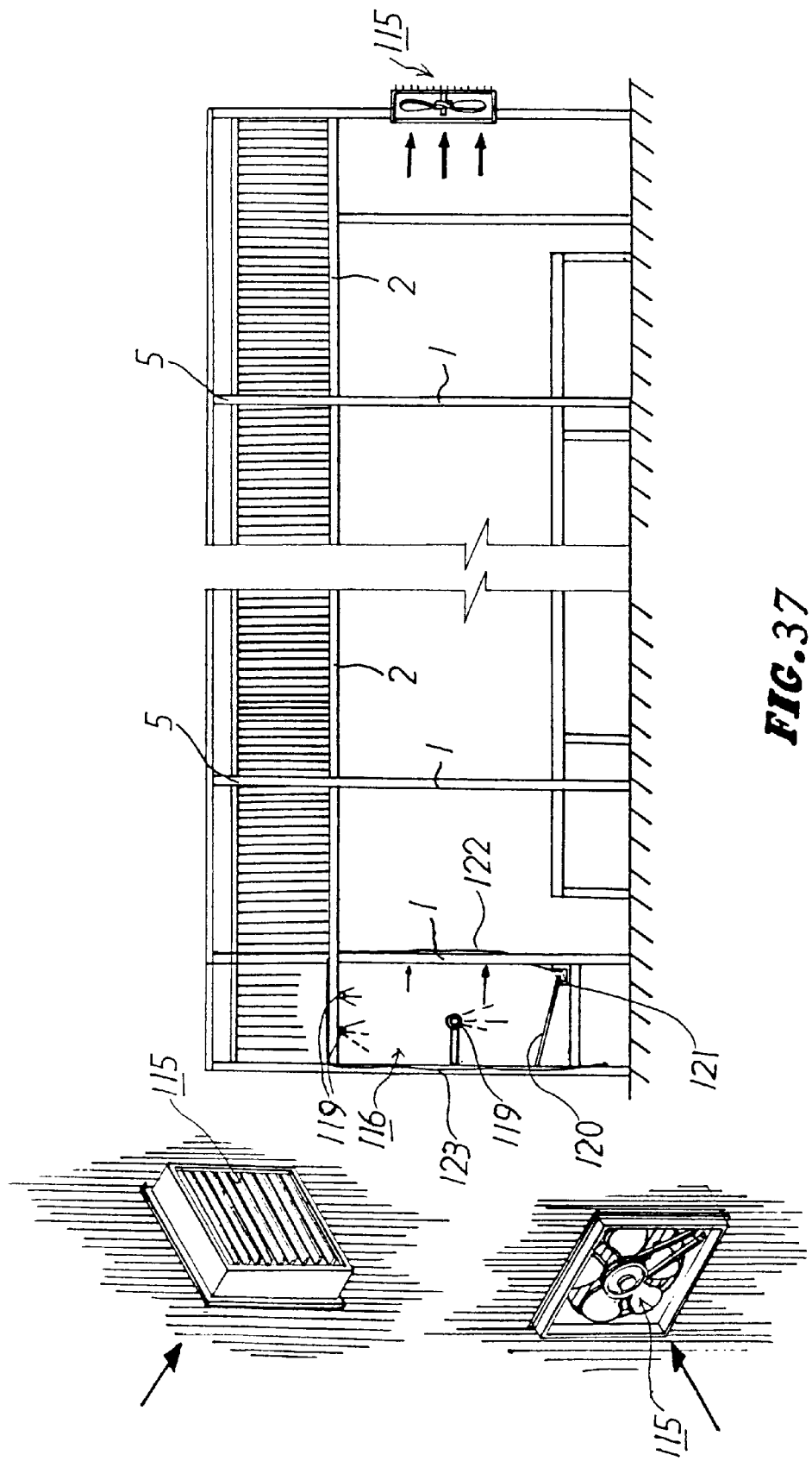
FIG. 37 is a schematic view of the atomizer convection device according to the present invention.

Atomizer Convection Device:

Referring to FIG. 37, a plurality of large-sized fans 115 are provided at one end of the greenhouse, with an atomizing device 116 at the other end.

Figure 38:
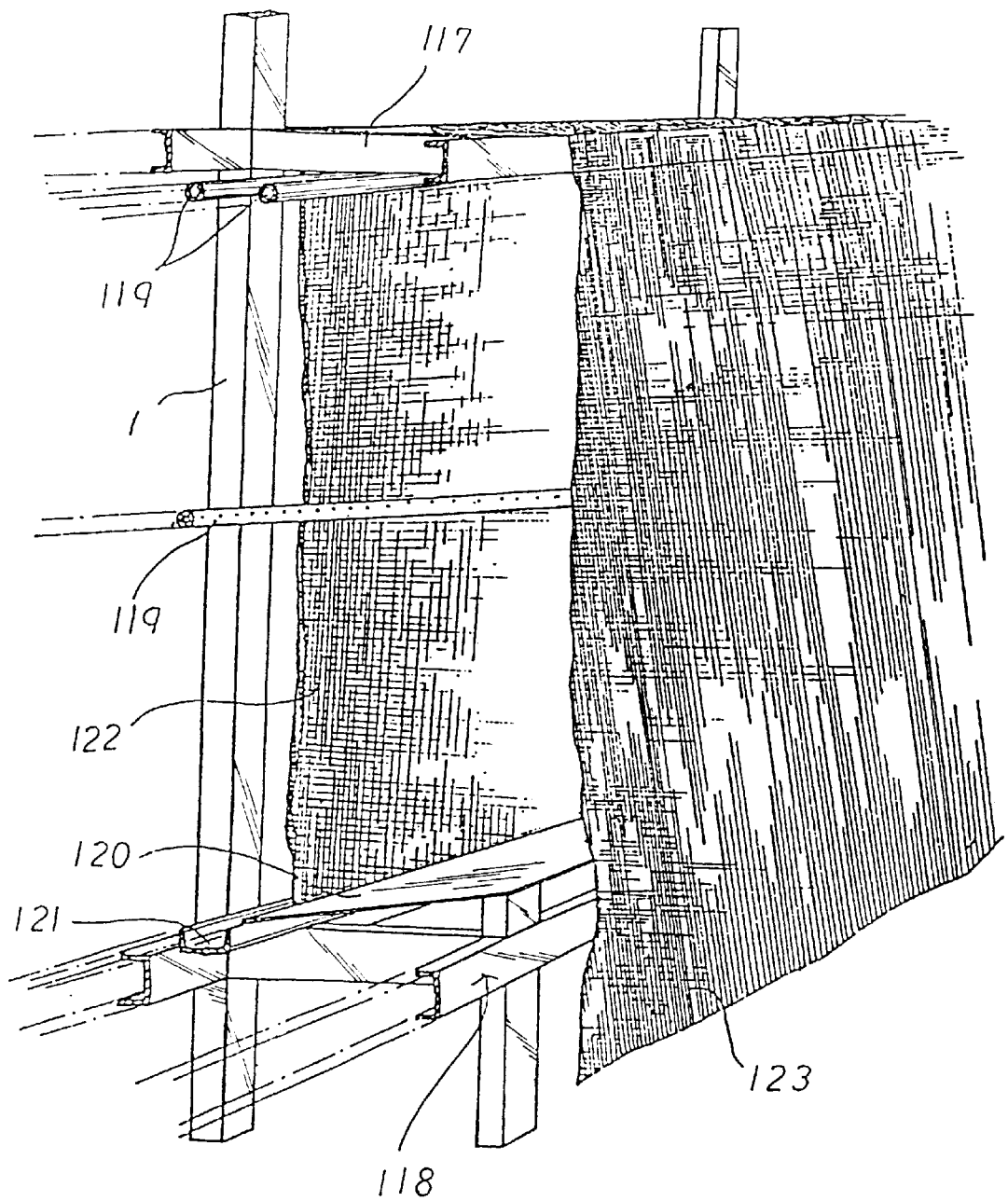
FIG. 38 is a perspective sectional view of the trimming aluminum bar according to the present invention.

Referring further to FIG. 38, the atomizer device 116 includes a support 117 secured outwardly of the top end of the support post 1 of the framework at one end of the greenhouse, a leg support 118 is also secured outwardly of the bottom end. An atomizer duct 119 is secured on the support 117, and a slanting base plate 120 is secured on the leg support 118. A double-layered net 122 is provided on an inner side of the atomizer device 116, while a single-layered net 123 is provided on the outer side. The bottom end of the double-layered net 122 is immersed in the water trough 121, so that misty water can be sprayed via the atomizer duct 119 onto the nets 122, 123.

The fan 115 at one end of the greenhouse draws the air inside the greenhouse to be discharged to the outside, while the atomizer device 116 at the other end draws air in, achieving a convection effect for air circulation. When the atomizer duct 119 of the atomizer device 116 sprays water between the inner and outer layer nets 122, 123, the air is filtered by the misty water sprayed by the atomizer duct 119 before being drawn into the greenhouse, further achieving the effect of lowering temperature. Furthermore, as the misty water is checked by the double-layered net 122 on the inner side, it will not enter directly into the greenhouse but will drop into a tank 121 following the net 122. Hence, the mesh size of the net 122 can be used to control the size of the water particles that are drawn into the greenhouse. Besides, after the misty water has dropped on the slanting base plate 120, it will be collected by the tank 121 and will not fall to the ground to create dampness. In addition, the slanting base plate 120 is configured to be washed easily so that pollution is avoided. Also, it is simple to construct.

Figure 39:
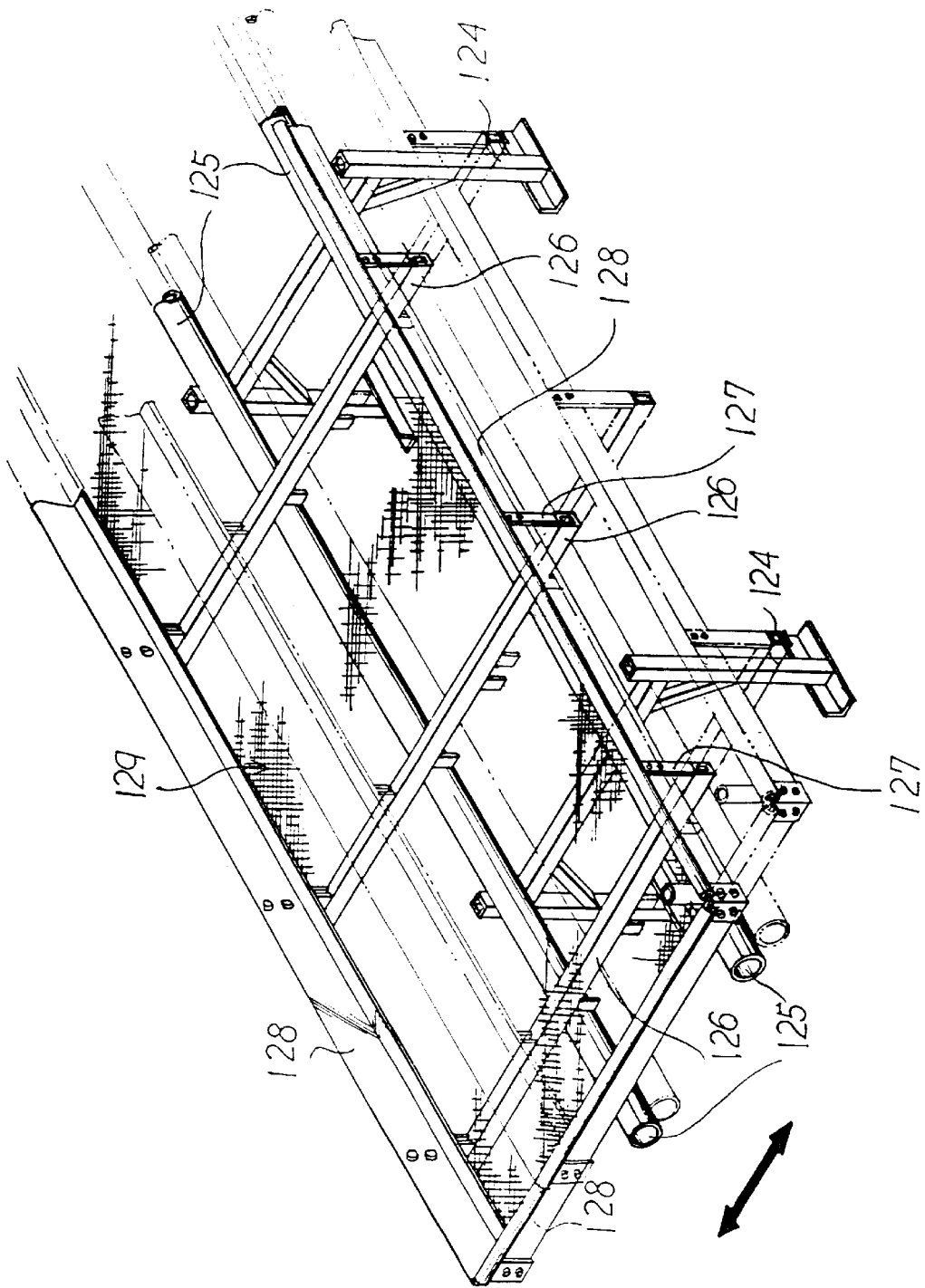
FIG. 39 is a perspective view of the bed planting device according to the present invention.
Figure 40:
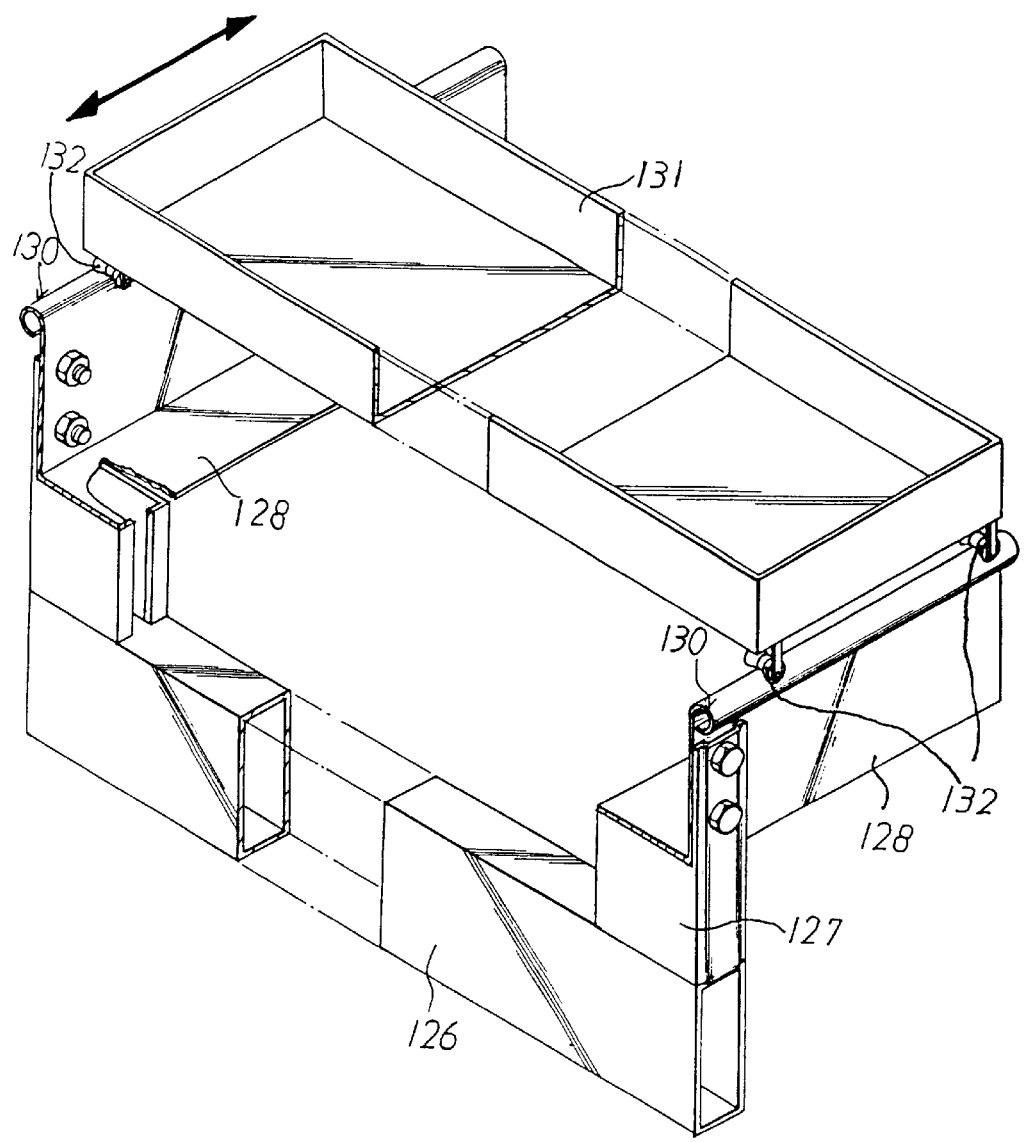
FIG. 40 is a perspective schematic view of the bed planting device according to the present invention.

Bed Planting Device:

Referring to FIGS. 39 and 40, leg supports 124 are spaced equi-distantly apart. Two parallel elongated rollers 125 are provided on top ends of the leg supports 124. U-shaped base bars 126 are equi-distantly provided on upper sides of the rollers 125. Integrally formed L-shaped bearing seats 127 are welded to both ends of the base bar 126 such that they face each other. A side frame 128 is secured on an inner side of each bearing seat 127 at either end of the base bar 126. The side plate 128 has a framed base for securing a wire fence 129 to form a planting bed so that the latter can slidably displace on top ends of the leg supports 124 by means of the rollers 125.

The device is characterized in that the side plate 128 has a top end extending to form a smooth substantially circular portion 130 to form a guide track along which rollers 132 of a trolley 131 can move.

Figure 41:
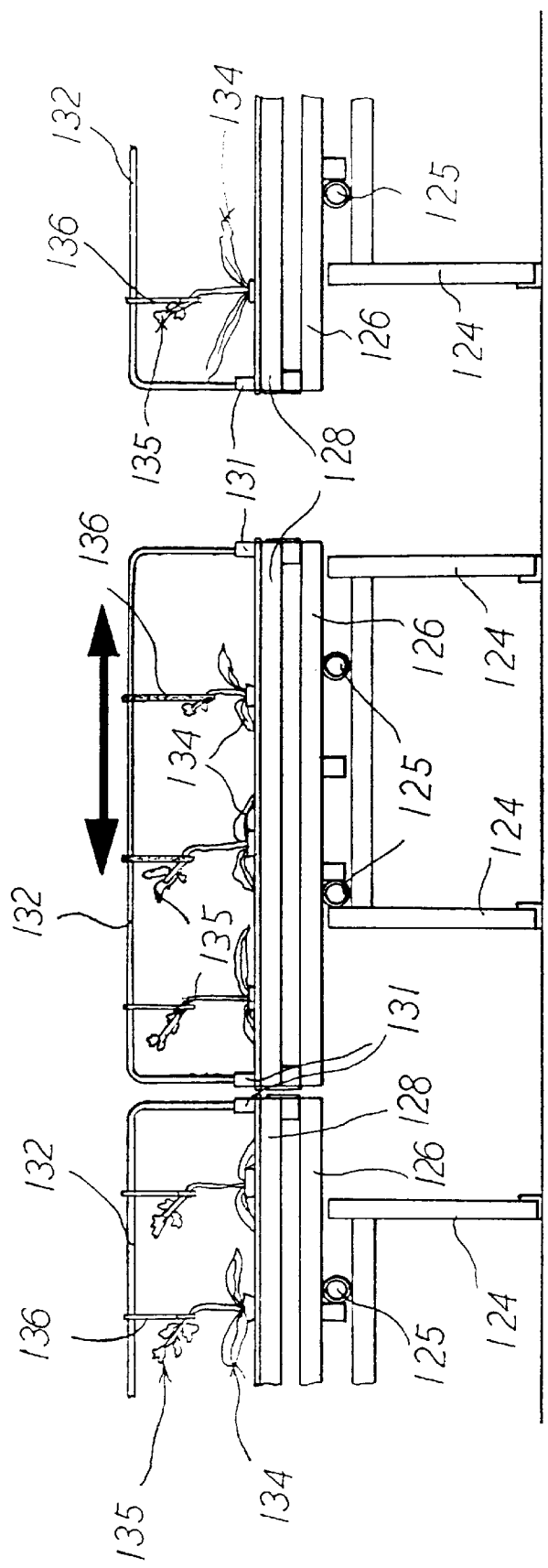
FIG. 41 is a perspective view of the arched support of the bed planting device according to the present invention.

With further reference to FIG. 41, a planar plate 140 having securing through holes 139 is also secured on the inner side of the bearing seat 127 at either end of the base bar 126. The planar plate 140 has a top end extending to form a tubular portion 141 for securing arched supports 132 thereon. The arched supports 142 are inter-connected and secured by ropes 133 for suspension of potted plants and supporting stems.

The substantially circular portion 130 at the top end of the side plate 128 not only is smooth and round in appearance, it also provides a smooth track for displacement of the rollers 132 of the trolley 131 to facilitate operation during cultivation (especially during cultivation of flower seedlings).

In summary, the greenhouse structure according to the present invention is convenient and quick to construct.

I claim:

1. A greenhouse structure comprising a framework, skylight king posts, an upper layer sun-shielding screen device, an inner layer sun-shielding screen device, a sun-shielding screens driving system, bottom frame bars of skylights and side windows, trimming aluminum bars, an atomizer convection device, and a bed planting device, wherein said framework includes a plurality of support posts equi-distantly erected, beams locked to both sides of top ends of said support posts using bolts, and rafters, water troughs, and studs connected thereto, each of said rafters having an L-shaped securing plate welded to a bottom end thereof, a horizontal end of said securing plate being secured onto said beam using bolts, said studs being passed through bolts that also pass through sides of said water troughs, said studs having an inverted U-shaped base welded to a bottom end thereof for fitting to inner sides of said water troughs and being passed through by said bolts to achieve interconnection and positioning;

said skylight king posts include a plurality of rectangular frame-shaped posts each having an upper end orienting upwardly and extending in opposite directions to both sides to form curled hook portions for receiving skylight pivot frames, the two sides of said king post near its bottom end respectively extending outwardly in opposite directions to form downwardly inclined side plates, the two end corners at the bottom end also extending outwardly respectively to form oblique plates that go beyond said side plates and are parallel thereto, said oblique plates each having a frame-shaped retaining gap extending along a bottom portion thereof, and an indented groove is provided on a top side thereof beyond said side plate, so that when a corrugated plate is inserted between said side plate and said oblique plate, tap screws can be inserted into said indented groove to lock said corrugated plate in position;

said upper layer sun-shielding screen device includes transverse supports mounted on an upper side of the roof of the greenhouse, pawls equi-distantly provided on upper and lower end faces of said transverse supports, said pawls among said transverse supports being used to retain and secure longitudinal steel wires, and transverse drive bars being disposed between every adjacent supports between upper and lower steel wires, said transverse drive bars having a U-shaped cross section with a recessed T-shaped groove on a top end face thereof and a projecting T-shaped groove on a back side face and a bottom end face thereof, rubber strips being inserted into said T-shaped groove on the back side face, and hanging hooks being inserted into said T-shaped grooves on the top end face and the bottom end face respectively for retaining said steel wires, a plurality of claw plates being further inserted into said T-shaped groove on the top face of the bottom end face to secure one end of said upper sun-shielding screen on said supports, with the other end secured by said claw plates to said drive bars, so that said drive system can drive said drive bars to reciprocate among said supports along said steel wires to achieve extending or closing of said upper sun-shielding screen, both ends of said drive bars on both sides of the greenhouse bending downwardly and extending to said beams of said framework, and cooperating with said claws to retain said upper sun-shielding screen and reciprocate between said upper and lower steel wires to enhance sun-shielding effects on the sides of the greenhouse;

said inner layer sun-shielding screen device includes a plurality of I-shaped connecting seats to secure elongated drive bars in a fixed state, a plurality of parallel steel cables longitudinally mounted in the greenhouse just on upper and lower sides of said drive bars, a plurality of hanging hooks being provided on said drive bars on upper and lower sides to retain said steel cables, and a plurality of transverse movable drive bars disposed between upper and lower steel cables between adjacent beams, with both ends secured locked by bolts, said movable drive bars being provided with said hanging hooks on upper and lower sides thereof for retaining said steel cables to secure one end of said inner sun-shielding screen on said fixed drive bars, with the other end secured on said movable drive bars, whereby said drive bars of said drive system drives said movable drive bars to displace between said upper and lower cables to achieve extending and closing of said inner sun-shielding, said upper and lower cables further preventing said inner sun-shielding screen from collapsing or getting entangled;

said sun-shielding screens driving system is particularly a drive system for driving drive bars of said upper and inner sun-shielding screens and includes a plurality of equi-distantly spaced opposed pulleys provided on the bottom portion of said transverse supports that secure said drive bars of said sun-shielding screens, said pulleys being used to support and limit a plurality of parallel longitudinal guide bars, each of said transverse drive bars of said sun-shielding screens being secured on said guide bars, each of said guide bars having a rack disposed on a middle portion thereof, said rack having a U-shaped cross section and a length slightly larger than the extended travel distance of said sun-shielding screens, a transverse rotary shaft being secured at below said transverse support corresponding to said rack, said rotary shaft being provided with a gear to engage said rack, said rotary shaft being driven by a speed reduction motor provided on a middle portion thereof to drive said sun-shielding screens;

said bottom side frames of skylights and side windows each include a T-shaped insert groove formed on a top end of a cross section thereof towards an inner side, a planar plate extending downwardly from a bottom portion of said insert groove, and an upright plate erected on an inner side of a bottom end of said planar plate, said planar plate bending outwardly and extending to be parallel to said upright plate so as to define therebetween a screw insert slot, said planar plate further extending downwardly to form a plane plate having a smaller T-shaped insert groove formed at a bottom side thereof on the inner side, with a T-shaped insert groove formed on the outer side;

said trimming aluminum bars are elongated bars having a cross section that includes two right-angled inner and outer layer plates connected by partition plates in a parallel relationship such that there are clearances therebetween, said inner layer plate having an axial length longer than that of said outer layer plate, said clearances receiving side edges of end edges of corrugated plates to achieving the purpose of trimming;

said atomizer convection device includes a large-size fan at one end of the greenhouse and an atomizer device at the other, said fan drawing air out of the greenhouse to achieve convection and hence circulation of air inside the greenhouse, said atomizer device includes a support secured outwardly of the top end of said support posts of said framework with a leg support secured outwardly of the bottom end, an atomizer duct secured on said support, and a slanting base plate secured on said leg support, a water tank provided at a bottom end of said slanting base plate, a double-layered net provided on an inner side of said atomizer duct, and a single-layered net provided on the outer side of said atomizer duct, whereby said atomizer duct sprays misty water on said inner and outer layer nets to clean the air drawn in by convection; and said bed planting device includes leg supports spaced equi-distantly apart, two parallel elongated rollers provided on top ends of said leg supports, U-shaped base bars equidistantly provided on upper sides of said rollers, integrally formed L-shaped bearing seats welded to and erected at both ends of said base bar such that they face each other, a side plate having an L-shaped cross section secured on an inner side of each bearing seat at either end of said base bar, said side plate having a framed base for securing a wire fence to form a planting bed, said L-shaped cross section of said side plate having a top end extending to form a smooth substantially circular portion to form a guide track along which rollers of a trolley can move, arched supports being secured on the inner side of said side plate where said side plate is secured on the inner side of said bearing seat at either end of said base bar, said arched supports being inter-connected by ropes to hang potted flowers and plants or to support stems of flowers and plants.

* * * * *